(12) United States Patent
Kornilovich et al.

(10) Patent No.: US 11,794,186 B2
(45) Date of Patent: Oct. 24, 2023

(54) MICROFLUIDIC DEVICES INCLUDING FLUIDIC MULTIPLEXERS

(71) Applicant: HEWLETT-PACKARD DEVELOPMENT COMPANY, L.P., Spring, TX (US)

(72) Inventors: Pavel Kornilovich, Corvallis, OR (US); Alexander Govyadinov, Corvallis, OR (US); Anand Samuel Jebakumar, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 137 days.

(21) Appl. No.: 17/384,376

(22) Filed: Jul. 23, 2021

(65) Prior Publication Data
US 2023/0035535 A1    Feb. 2, 2023

(51) Int. Cl.
*B01L 3/00* (2006.01)

(52) U.S. Cl.
CPC . *B01L 3/502738* (2013.01); *B01L 2200/0605* (2013.01); *B01L 2300/18* (2013.01); *B01L 2400/0622* (2013.01)

(58) Field of Classification Search
CPC ....... B01L 3/502738; B01L 2200/0605; B01L 2300/18; B01L 2400/0622
See application file for complete search history.

(56) References Cited

U.S. PATENT DOCUMENTS

| 6,062,681 A | 5/2000 | Field et al. |
| 9,714,443 B2 | 7/2017 | Maerkl et al. |
| 2019/0366340 A1* | 12/2019 | Govyadinov ....... F16K 99/0019 |

FOREIGN PATENT DOCUMENTS

WO   PCT/US2020/054957    10/2020

OTHER PUBLICATIONS

Thorsen, T. et al. "Microfluidic Large-Scale Integration." Science 298 (2002): 580-584. DOI: 10.1126/science.1076996.
Huang Y, Castrataro P, Lee CC, Quake SR. Solvent resistant microfluidic DNA synthesizer. Lab Chip. Jan. 2007;7(1):24-6. doi: 10.1039/b613923j. Epub Nov. 30, 2006.
Melin J, Quake SR. Microfluidic large-scale integration: the evolution of design rules for biological automation. Annu Rev Biophys Biomol Struct. 2007;36:213-31. doi: 10.1146/annurev.biophys.36.040306.132646.

* cited by examiner

*Primary Examiner* — Jennifer Wecker
*Assistant Examiner* — Oyeleye Alexander Alabi
(74) *Attorney, Agent, or Firm* — Foley & Lardner LLP

(57) ABSTRACT

An example microfluidic device comprises a plurality of fluidic channels and a fluidic multiplexor. The fluidic multiplexor includes a plurality of fluidic micro-valves fluidically coupled to the plurality of fluidic channels, and a plurality of control lines that cross the plurality of fluidic channels proximal to the plurality of fluidic micro-valves.

12 Claims, 12 Drawing Sheets

MICROFLUIDIC DEVICES INCLUDING FLUIDIC MULTIPLEXERS

BACKGROUND

Microfluidic devices may be used to perform operations on volumes of fluid. For example, microfluidic devices may move, mix, separate, and/or perform fluidic analysis on or using different types of fluids. Such devices may be used in the medical industry, for example to analyze deoxyribonucleic acid (DNA), detect pathogens, perform clinical diagnostic testing, and/or for synthetic chemistry. Such devices may be used in other types of industries and/or for other purposes.

DETAILED DESCRIPTION

Figure 1:
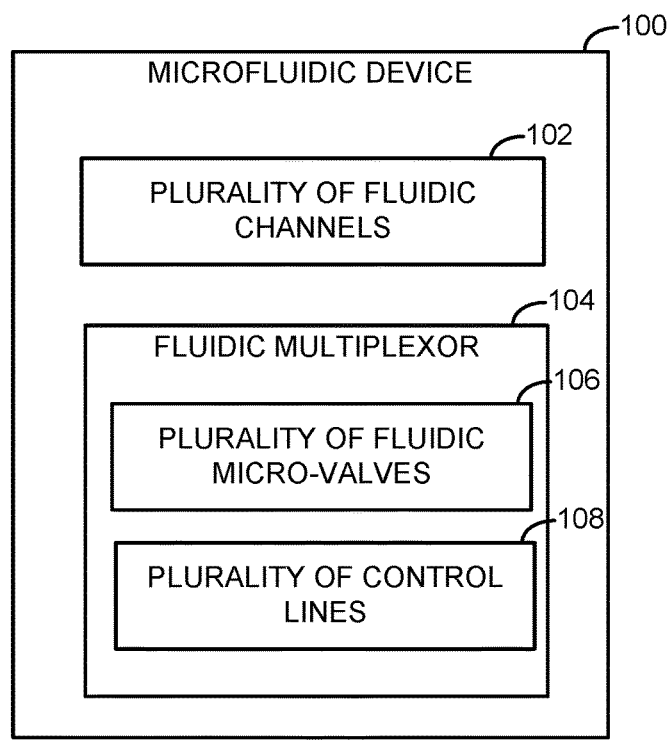
FIG. 1 illustrates an example microfluidic device comprising a fluidic multiplexer (FMUX), in accordance with the present disclosure.

In the following detailed description, reference is made to the accompanying drawings which form a part hereof, and in which is shown by way of illustration of specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Microfluidic devices may have fluid input thereto and may perform operations thereon. In some examples, the microfluidic device may operate with more than one fluid at a time. For example, a microfluidic device may implement a polymerase chain reaction (PCR) protocol using five to six fluids, such as a biologic sample, lysis buffer, DNA isolation buffer, wash buffer, mastermix, and primers. As another example, a microfluidic device may implement DNA synthesis, such as for synthetic chemistry purposes, and may use eight to nine fluids, such as four deoxynucleoside triphosphate (dNTP) precursors, a de-blocking agent, two coupling agents, an oxidizing agent, and wash buffer. In further examples, DNA compounds may be synthesized out of DNA oligomer libraries. In other examples, the microfluidic device may sort or distribute a fluid by controlling fluid flow to multiple fluidic outputs, such as for parallel processing of multiple tests.

Examples in accordance with the present disclosure are directed to microfluidic devices that control workflows involving many fluids and/or many fluidic outputs, such as a compact, integrated microfluidic chip. The microfluidic device may control fluid flow through tens, hundreds, or more, of fluidic channels using a fluidic multiplexer (FMUX) which is integrated on the microfluidic device. As used herein, a FMUX includes and/or refers to an array of components (e.g., fluidic micro-valves and control lines) that selectively control output flow of fluid through a plurality of fluidic channels, such as by selecting a fluidic channel from the plurality of fluidic channels as an output for fluid flow. For example, the FMUX includes a plurality of fluidic micro-valves fluidically coupled to the plurality of fluidic channels and a plurality of control lines that cross the plurality of control lines proximal to the plurality of fluidic micro-valves. The plurality of control lines transmit electrical signals to respective fluidic micro-valves to control the flow of fluid through the plurality of fluidic channels. The FMUX exponentially increases fluidic processing ability by allowing complex fluid manipulation while minimizing the data inputs to control the flow of fluid and minimizing the size of the FMUX using internal sources, e.g., the control lines, for control of the fluidic micro-valves.

In some examples, the fluidic micro-valves of the FMUX are thermo-pneumatic working on thermal expansion and contraction of trapped gas due to temperature changes. The fluidic micro-valves may include dead-end side chambers that trap gas when the microfluidic device is primed with fluid. After priming, the temperature of particular fluidic micro-valves may be raised from a first temperature to a second temperature which causes the gas to expand into the coupled fluidic channel and block the flow of fluid. When the second temperature is lowered to the first temperature, the gas bubble is sucked back in the side chamber and the flow in the fluidic channel resumes. Capillary breaks may help to stabilize the menisci at fixed locations in the open and closed states. The thermo-pneumatic operating fluidic micro-valves may be used in a FMUX, in various examples, to provide integrated control and scalable control of an exponential plurality of fluidic channels.

In some examples, a microfluidic device comprises a plurality of fluidic channels, and a FMUX. The FMUX includes a plurality of fluidic micro-valves fluidically coupled to the plurality of fluidic channels, and a plurality of control lines that cross the plurality of fluidic channels proximal to the plurality of fluidic micro-valves.

As some examples, a microfluidic device comprises a plurality of fluidic channels, a plurality of fluidic micro-valves fluidically coupled to the plurality of fluidic channels, a plurality of pairs of control lines that cross the plurality of fluidic channels proximal to the plurality of fluidic micro-valves, and circuitry coupled to the plurality of pairs of control lines and to address the plurality of pairs of control lines to set a first subset of the plurality of fluidic micro-valves in an open state, and set a second subset of the plurality of fluidic micro-valves in a closed state. The subset of the plurality of fluidic micro-valves in the open state and the second subset of the plurality of fluidic micro-valves in the closed state allow flow of fluid through a subset of the plurality of fluidic channels and prevent the flow of fluid through the remaining plurality of fluidic channels.

In further examples, a method comprises applying a first temperature to a first subset of a plurality of fluidic micro-valves of a microfluidic device, wherein the plurality of fluidic micro-valves are in fluidic communication with a plurality of fluidic channels of the microfluidic device. The method further includes applying a second temperature to a second subset of the plurality of fluidic micro-valves, wherein the second temperature is higher than the first temperature, and in response to applying the first temperature and the second temperature, flowing fluid through one of the plurality of fluidic channels and preventing flow of fluid through the remaining plurality of fluidic channels. That is, applying the first and second temperatures may include causing fluid flow through one of the plurality of fluidic channels while fluid flow through the remaining plurality of fluidic channels is prevented.

Turning now to the figures, FIG. 1 illustrates an example microfluidic device comprising a FMUX, in accordance with the present disclosure. As shown by FIG. 1, the microfluidic device 100 includes a plurality of fluidic channels 102 and a FMUX 104.

Figure 2:
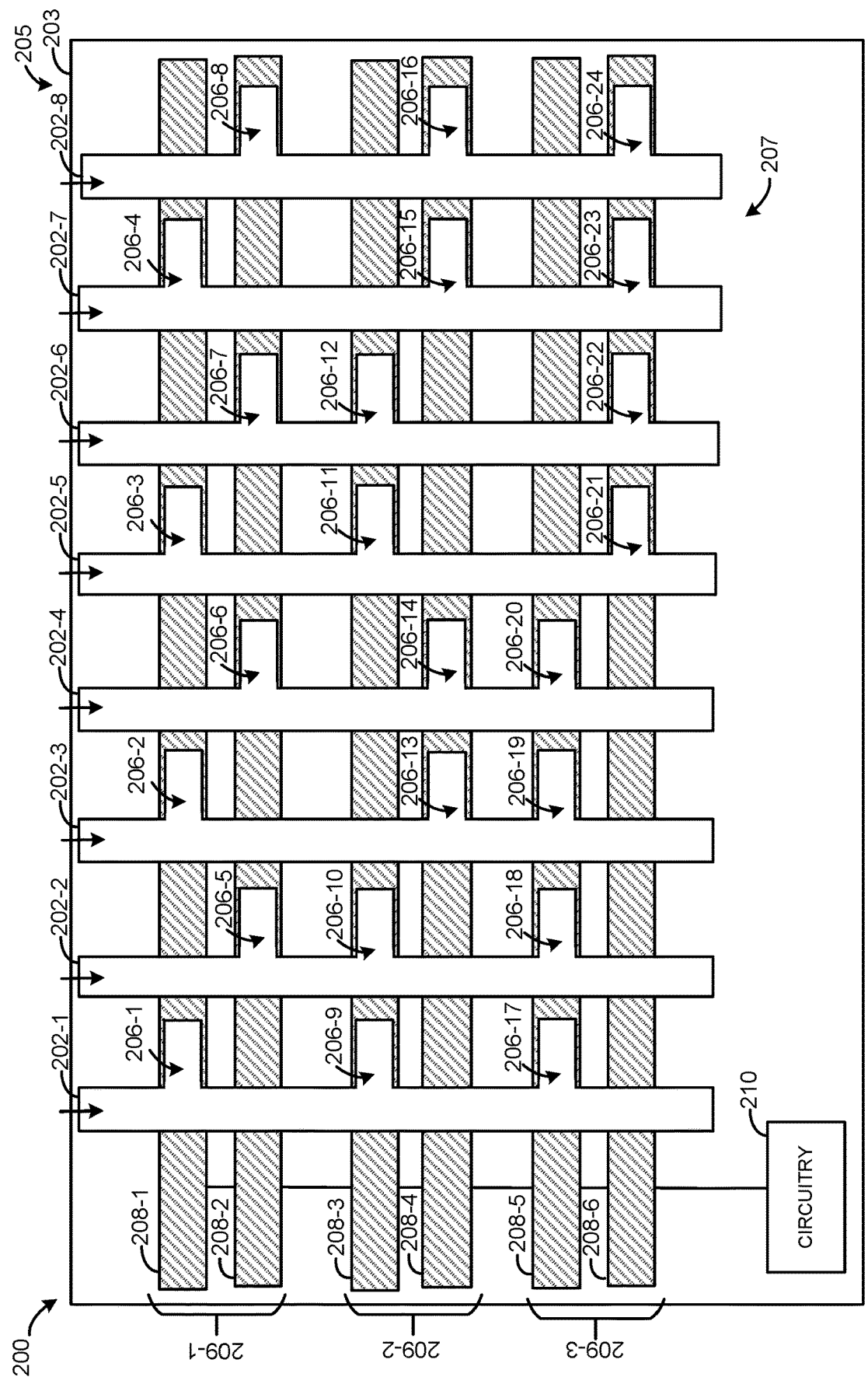
FIG. 2 illustrates another example microfluidic device comprising a FMUX and circuitry to control the FMUX, in accordance with the present disclosure.

The plurality of fluidic channels 102 may extend from an input side to an output side, which is further illustrated by FIG. 2. The plurality of fluidic channels 102 may be coupled to a fluidic input at or proximal to the input side of the plurality of fluidic channels 102, which provides fluid to the plurality of fluidic channels 102. Flow of fluid from the input side to the output side may be provided by a pressure gradient, as further described herein.

The FMUX 104 includes a plurality of fluidic micro-valves 106 fluidically coupled to the plurality of fluidic channels 102. In some examples, each of the plurality of fluidic micro-valves 106 include a passage comprising an opening fluidically coupled to a respective fluidic channel of the plurality of fluidic channels 102 and a side chamber to house a volume of trapped gas, the side chamber being fluidically coupled to the passage to control flow along the respective fluidic channel, which is further illustrated by FIGS. 3A-3B. However, examples are not so limited and may include other types of fluidic micro-valves 106 which are fluidically coupled to the plurality of fluidic channels 102. In various examples, each of the plurality of fluidic micro-valves 106 includes one of the following two states at a given time: an open state in which the respective fluidic channel is open and fluid is to flow through the respective fluidic channel, and a closed state in which trapped gas within the side chamber is to expand within the passage and block the flow in the respective fluidic channel.

The FMUX 104 further includes a plurality of control lines 108 that cross the plurality of fluidic channels 102 proximal to the plurality of fluidic micro-valves 106. In some examples, the plurality of control lines 108 are thermally coupled to the plurality of fluidic micro-valves 106 to control the plurality of fluidic micro-valves 106 and to allow fluid to flow through the plurality of fluidic channels 102.

The plurality of control lines 108 may allow fluid to flow through a select subset of the plurality of fluidic channels 102 and prevent flow of fluid through the remaining plurality of fluidic channels 102. For example, the plurality of control lines 108 are thermally coupled to the plurality of fluidic micro-valves 106 to control the plurality of fluidic micro-valves 106 and to allow fluid to flow through a select one of the plurality of fluidic channels 102 and to prevent the flow of fluid through the remaining plurality of fluidic channels 102.

In some examples, electrical signals may be transmitted over the plurality of control lines 108 to control the plurality of fluidic micro-valves 106. For example, the microfluidic device may further include circuitry to transmit digital data as electrical signals over the plurality of control lines 108 to control the plurality of fluidic micro-valves 106 and to control the flow of fluid through the plurality of fluidic channels 102. The electrical signals may include selectively applied current and/or voltage, which may be used to change a temperature of selected fluidic micro-valves of the plurality of fluidic micro-valves 106, as further described herein. The circuitry may include electrical connections which are coupled to integrated control circuitry or external control circuitry. The digital data may be provided as binary code to the plurality of control lines 108, such as a binary code including N bits and with each bit being addressed to a pair of the plurality of control lines 108 and/or a control line.

In various examples, each of the plurality of fluidic channels 102 are coupled to $2^N/2$ fluidic micro-valves 106, and the microfluidic device 100 has 2N control lines 108 and $2^N$ fluidic channels 102, wherein N data inputs to the plurality of control lines 108 are to control the flow of fluid through each of the $2^N$ fluidic channels 102. The N data inputs may each include a bit. However, examples are not so limited, and in some examples, the microfluidic device 100 may have 2N−1 control lines and $2^N$ fluidic channels.

In some examples, the plurality of fluidic channels 102 and the plurality of fluidic micro-valves 106 are disposed in a first layer of the microfluidic device 100 and the plurality of control lines 108 are disposed in a second layer of the microfluidic device 100. The plurality of fluidic channels 102 may be thermally insulated from the plurality of control lines 108, and the fluidic micro-valves 106 may be thermally coupled to the plurality of control lines 108.

Figure 6:
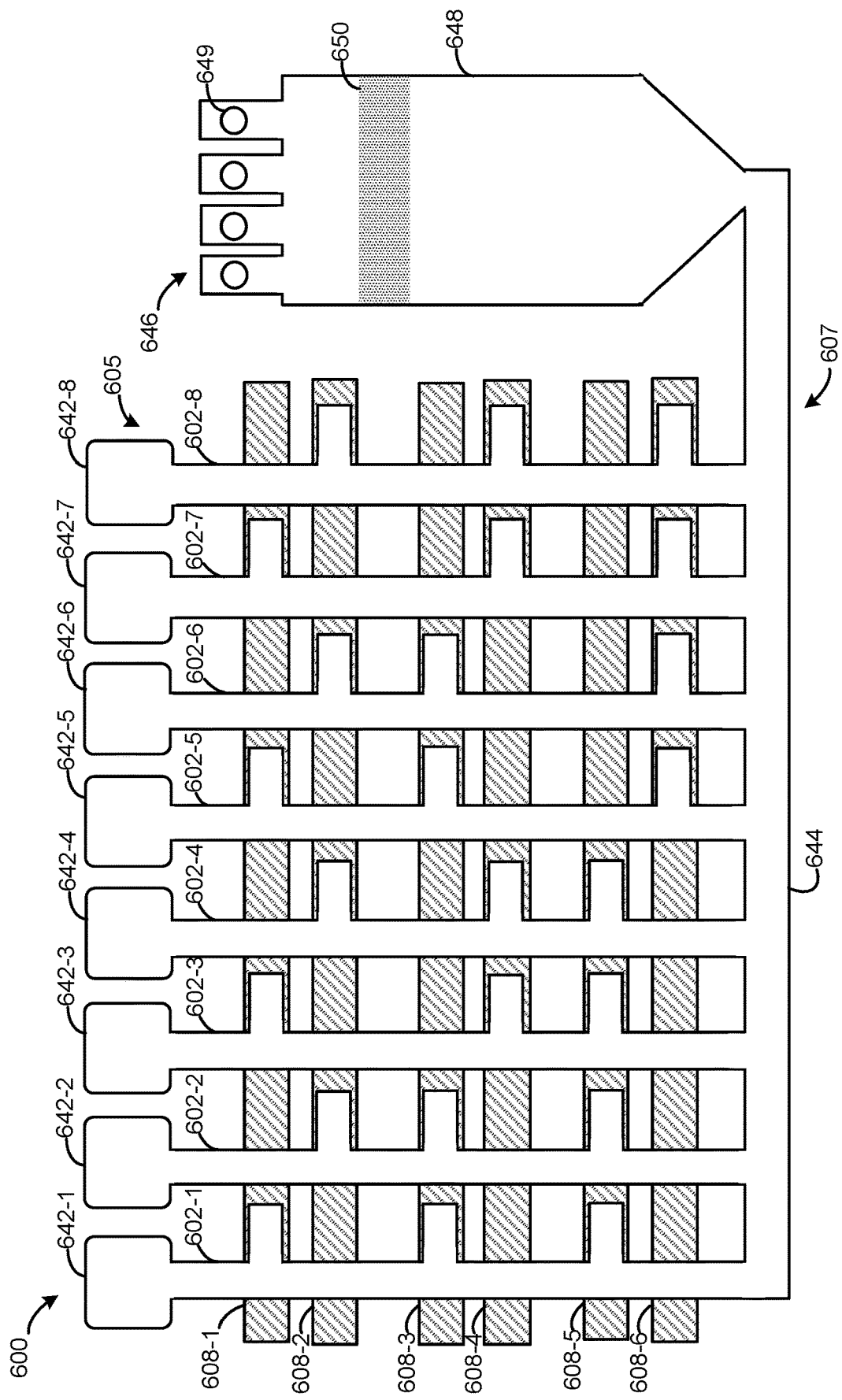
FIG. 6 illustrates an example microfluidic device comprising a FMUX, a plurality of fluidic inputs and an output chamber, in accordance with the present disclosure.
Figure 7:
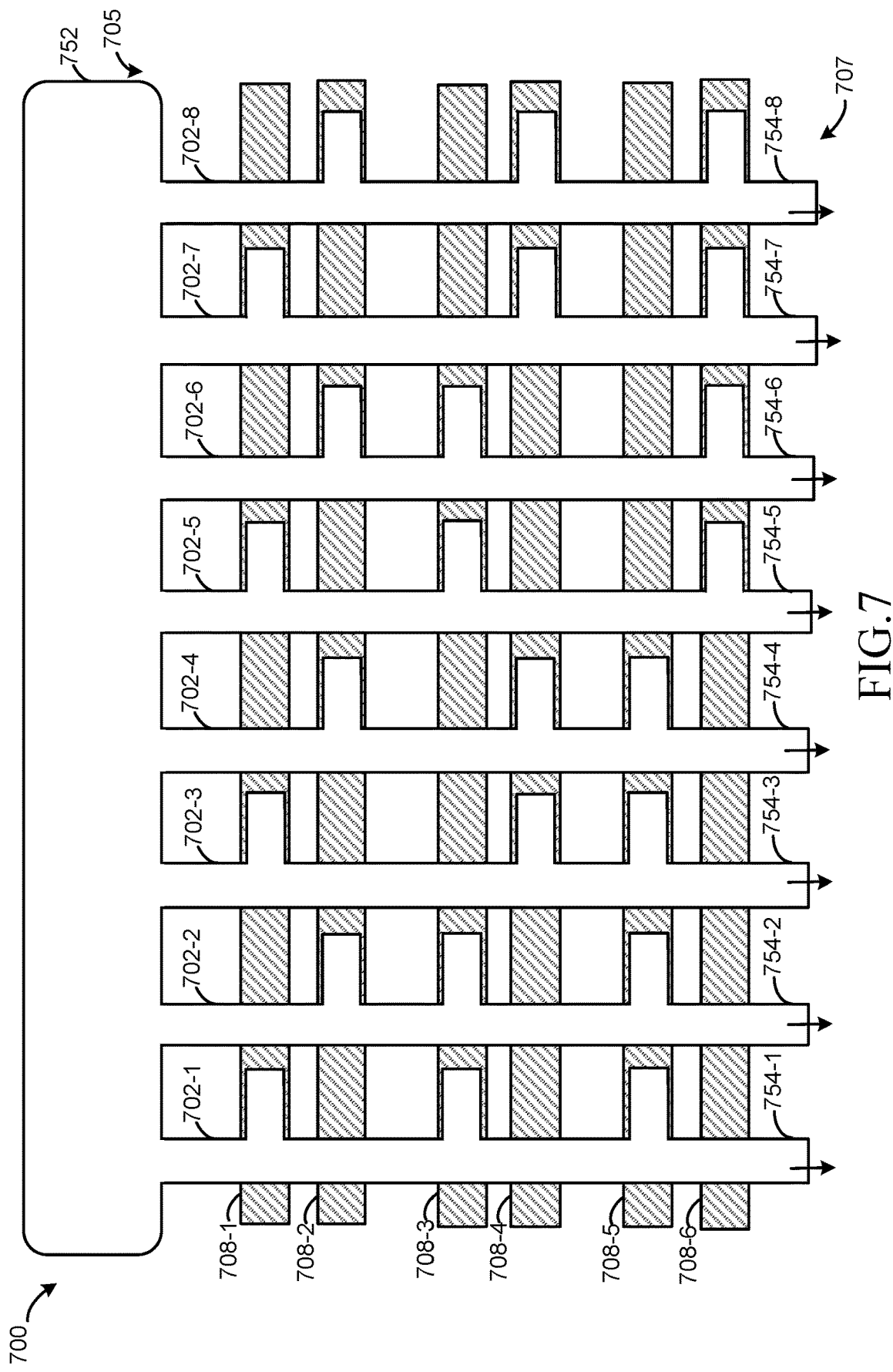
FIG. 7 illustrates an example microfluidic device comprising a FMUX, a fluidic input, and a plurality of fluidic outputs, in accordance with the present disclosure.
Figure 9:
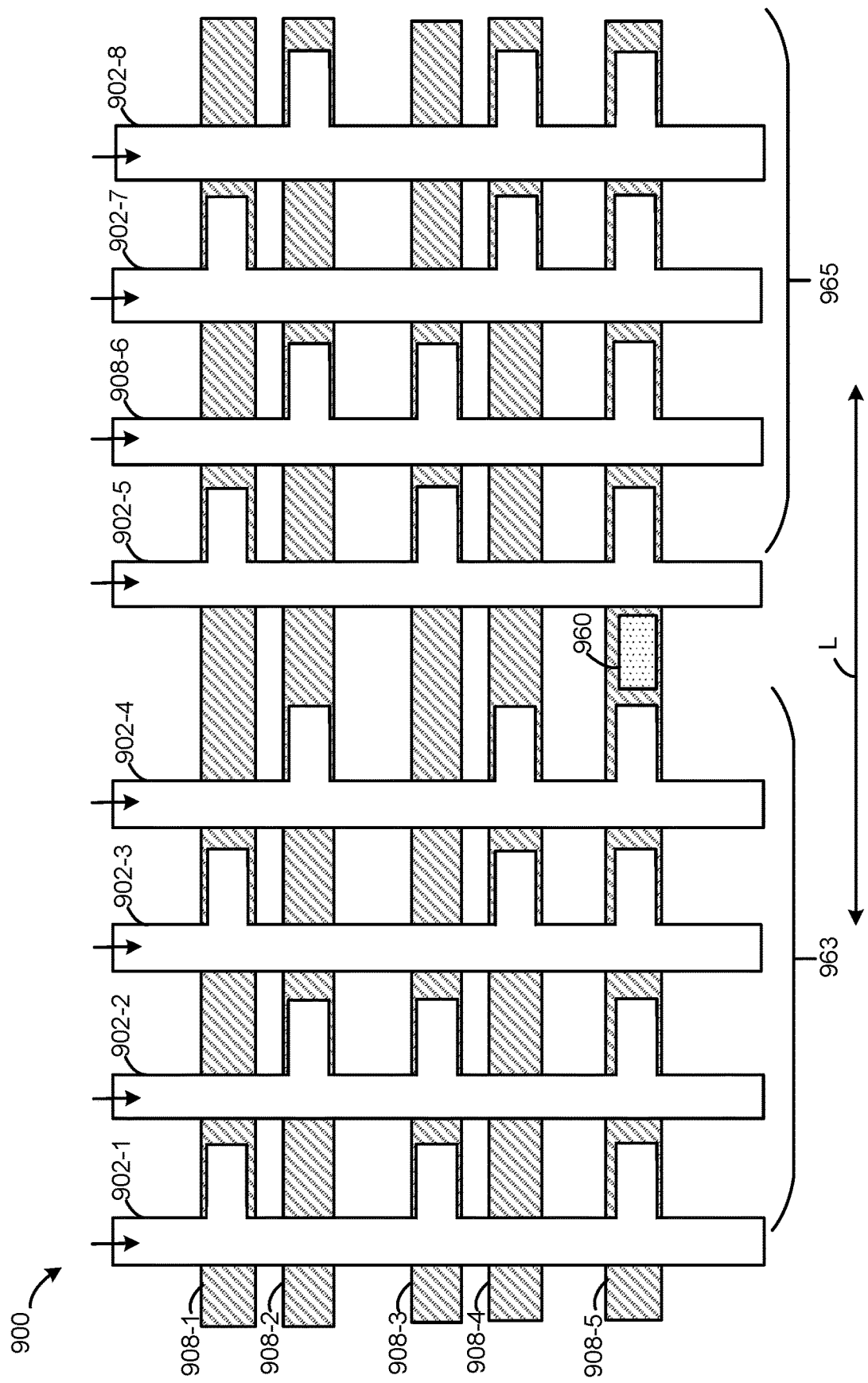
FIG. 9 illustrates an example microfluidic device comprising a FMUX with a thermal barrier disposed within a control line of a plurality of control lines, in accordance with the present disclosure.

Example microfluidic device 100 may include a variety of variations. For example, the microfluidic device 100 may include a thermal barrier disposed within a control line of the plurality of control lines 108, such as illustrated by FIG. 9. In other examples, the FMUX 104 may be used as a front end to a reactor, such as illustrated by FIG. 6. For example, the microfluidic device 100 may further include a plurality of fluidic inputs, each of the plurality of fluidic inputs fluidically coupled to one of the plurality of fluidic channels 102, and an output chamber fluidically coupled to each of the plurality of fluidic channels 102. In some examples, the FMUX 104 may be used as a distributor and/or sorter, such as illustrated by FIG. 7. For example, the microfluidic device 100 may further include a fluidic input fluidically coupled to each of the plurality of fluidic channels 102, and a plurality of fluidic outputs, each of the plurality of fluidic outputs fluidically coupled to one of the plurality of fluidic channels 102.

FIG. 2 illustrates another example microfluidic device comprising a FMUX and circuitry to control the FMUX, in accordance with the present disclosure. The microfluidic device 200 may include an implementation of the microfluidic device 100 of FIG. 1.

The microfluidic device 200 includes a plurality of fluidic channels 202-1, 202-2, 202-3, 202-4, 202-5, 202-6, 202-7, 202-8 (herein generally referred to as "the plurality of fluidic channels 202" for ease of reference), a plurality of fluidic micro-valves 206-1, 206-2, 206-3, 206-4, 206-5, 206-6, 206-7, 206-8, 206-9, 206-10, 206-11, 206-12, 206-13, 206-14, 206-15, 206-16, 206-17, 206-18, 206-19, 206-20, 206-21, 206-22, 206-23, 206-24 (herein generally referred to as "the plurality of fluidic micro-valves 206" for ease of reference), a plurality of control lines 208-1, 208-2, 208-3, 208-4, 208-5, 208-6 (herein generally referred to as "the control lines 208"), and circuitry 210. The control lines 208 may be grouped in pairs, which may be referred to as a plurality of pairs of control lines 209-1, 209-2, 209-3 (herein generally referred to as "the plurality of pairs of control lines 209" for ease of reference). The plurality of pairs of control lines 209 may be considered "digital bits" and each pair of the plurality of pairs of control lines 209 may be addressed by a bit of a binary code provided by the circuitry 210, as further described herein.

The plurality of fluidic micro-valves 206 and the plurality of pairs of control lines 209 may form a FMUX and the plurality of pairs of control lines 209 include conductive wires embedded within the microfluidic device 200, as previously described. As further described below, each control line of the plurality of pairs of control lines 209 cross the plurality of fluidic channels 202 at a different distance along a direction of flow and to provide electrical signals, in response to a binary code from the circuitry 210, to thermally control the plurality of fluidic micro-valves 206 and to respectively set the first subset of the plurality of fluidic micro-valves 206 in the open state and the second subset of the plurality of fluidic micro-valves 206 in the closed state.

The FMUX may be formed on the microfluidic device 200 by molding the plurality of pairs of control lines 209 into a substrate 203 of the microfluidic device 200. In some examples, the substrate 203 includes an epoxy molding compound (EMC) and the plurality of pairs of control lines 209 include conductive wires, such as silicon slivers. The plurality of fluidic channels 202 and the plurality of fluidic micro-valves 206 may be formed of photoresist polymer material, such as an epoxy-based photoresist or SU8. The plurality of fluidic channels 202 and the plurality of fluidic micro-valves 206 may be formed on a first layer and the plurality of pairs of control lines 209 formed on a second layer of the microfluidic device 200.

As illustrated, the plurality of fluidic micro-valves 206 are fluidically coupled to the plurality of fluidic channels 202. The plurality of fluidic micro-valves 206 may be set in different states using thermal control. Each of the plurality of fluidic micro-valves 206 may include a side chamber, a passage fluidically coupled to the side chamber and a respective fluidic channel of the plurality, as previously described. In some examples, a portion of the respective fluidic channel may be considered part of the fluidic micro-valve.

The plurality of pairs of control lines 209 cross the plurality of fluidic channels 202 proximal to the plurality of fluidic micro-valves 206. As described above, the plurality of pairs of control lines 209 may include conductive wires embedded within the microfluidic device 200. The conductive wires may carry electrical signals along the length of the wires. Each control line 208 of the plurality of pairs of control lines 209 may cross the plurality of fluidic channels 202 at a different distance along the direction of flow and may provide electrical signals, in response to a binary code from the circuitry 210, to thermally control the plurality of fluidic micro-valves 206.

The circuitry 210 is coupled to the plurality of pairs of control lines 209 and to address the plurality of pairs of control lines 209 to set a first subset of the plurality of fluidic micro-valves 206 in an open state and set a second subset of the plurality of fluidic micro-valves 206 in a closed state. In some examples, the first subset of the plurality of fluidic micro-valves 206 in the open state and the second subset of the plurality of fluidic micro-valves 206 in the closed state allow flow of fluid through a subset of the plurality of fluidic channels 202 and prevent the flow of fluid through the remaining plurality of fluidic channels 202. The subset may include one fluidic channel or multiple fluidic channels.

As previously described, the circuitry 210 may include electrical connections which may be coupled to internal or external control circuitry. In various examples, the circuitry 210 includes the electrical connections and control circuitry integrated on the microfluidic device 200, such as a microcontroller unit (MCU). However, examples are not so limited and the circuitry 210 may be coupled to external control circuitry. The circuitry 210 may provide a binary code that includes a bit addressed to each pair 209 of the plurality of pairs. For example, a binary code may include three bits, with a first bit of the binary code addressed to a first pair of control lines 209-1, a second bit of the binary code addressed to a second pair of control lines 209-2, and a third bit of the binary code addressed to a third pair of control lines 209-3. Each bit causes a first electrical signal of a first value to be transmitted along one control line of the pairs of control lines 209 and a second electrical signal of a second value to be transmitted along the other control line of the pairs of control lines 209. As further illustrated by FIGS. 4A-4B, the plurality of pairs of control lines 209 are to provide the electrical signals to apply a first temperature to the first subset of the plurality of fluidic micro-valves 206 to set the first subset of the fluidic micro-valves 206 in the open state, and apply a second temperature to the second subset of the plurality of fluidic micro-valves 206 to set the second subset of the fluidic micro-valves 206 in a closed state. In this manner, the control lines 208 act as heating components which are integrated on and/or embedded in the microfluidic device 200.

In some examples, the microfluidic device 200 has N pairs of control lines 209 and $2^N$ fluidic channels 202, wherein N data inputs to the plurality of pairs of control lines 209 are to control the flow of fluid through each of the $2^N$ fluidic channels 208, and each control line 208 of the plurality of pairs of control lines 209 being thermally coupled to $2^N/2$ fluidic micro-valves 206 of the plurality of fluidic micro-valves 206. However, examples are not so limited and may include other arrangements.

Fluid flow may be caused by pressure gradient between the input side 205 and the output side 207 of the plurality of fluidic channels 202. The pressure gradient may bias flow of fluid through the fluidic channels 202. In some examples, the pressure gradient is provided by gravity. In other examples, the pressure gradient is provided by actuation of a fluidic pump that is internal or external to the microfluidic device 200 or other sources of force. For example, the fluidic pump may be fired or pulsed, which creates the fluid flow by pushing or pulling fluid within the fluidic channels 202. In some examples, the fluidic pump includes a thermal inkjet (TIJ) resistor. Activation of the TIJ resistor may create the flow of fluid by firing drops of fluid from the fluidic channels 202 and/or creating a vapor bubble. As a specific example, a resistor may be actuated to cause firing of drops of fluid from an ejection nozzle, which creates the fluid flow through the fluidic channels 202 by pulling the fluid.

In some examples, the fluidic pump may include an inertial pump that actuates the fluid. In some examples, the fluidic pump may include a resistor, such as a thermal resistor. An example thermal resistor includes a TIJ resistor. However, examples are not so limited and a variety of different types of resistors may be used. Other example fluidic pumps include an integrated inertial pump, a piezoelectric device, a magnetostrictive element, an ultrasound source, and other suitable pumps. In some examples, the fluidic pump includes an ejection nozzle which is located at an opposite end of the fluidic channels 202 from the input side 205. The ejection nozzle may be used for ejecting fluid from the fluidic channels.

In some examples, the ejection nozzle may include a resistor and an orifice located near the resistor. The orifice may be used for ejecting fluid from the fluidic channels 202, such as ejecting fluid from the microfluidic device. In some examples, the orifice may include an interface to another microfluidic channel or a chamber of the microfluidic device 200 for further processing and/or analysis.

In some examples, the fluidic pump may include a resistor fluidically coupled to the plurality of fluidic channels 202 which does not form part of the ejection nozzle and which may be used to push and/or pull fluid within the fluidic channels 202. The resistor may be located proximal to the input side 205 of the plurality of fluidic channels 202, such as in a branching channel coupled to the plurality of fluidic channels 202, and the resistor may push the fluid in the direction of the arrows. In some examples, the resistor may be located proximal to the output end 207 of the plurality of fluidic channels 202 and may pull the fluid in the direction of the arrows. Control circuitry, which may form part of or is separate from the circuitry 210, may activate the resistor to cause the flow of fluid.

However, examples are not so limited and fluidic pumps may be external pumps, such as a syringe pump or peristaltic pump.

Figures 3A, 3B, 3C:
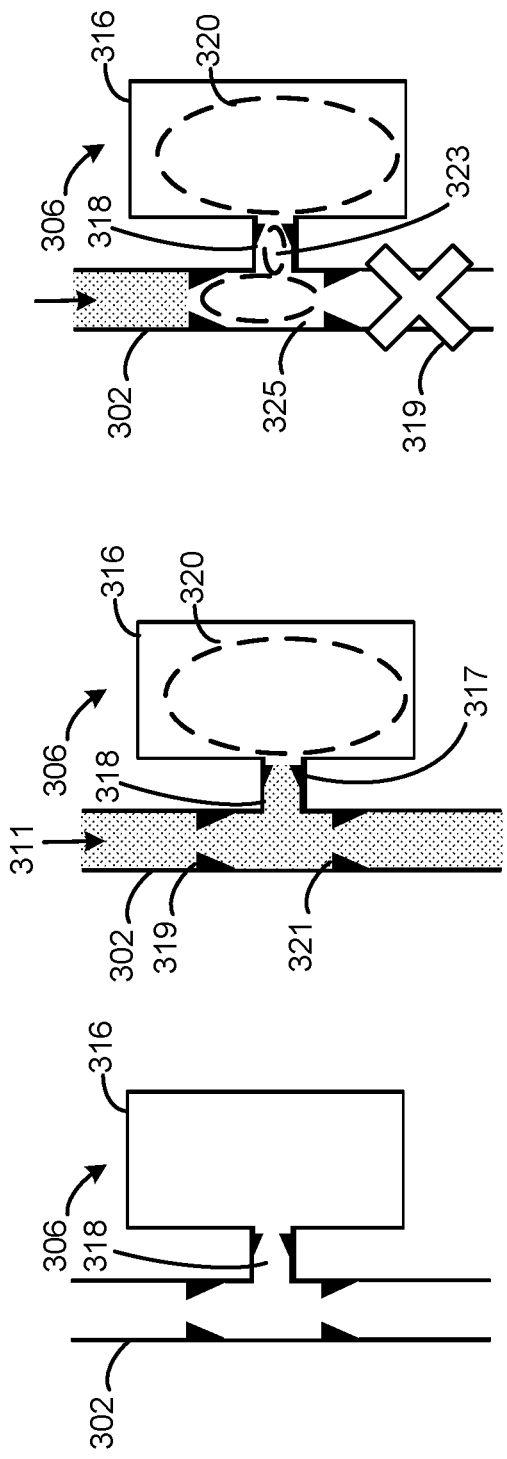
FIGS. 3A-3C illustrate an example fluidic micro-valve of an FMUX, in accordance with the present disclosure.

FIGS. 3A-3C illustrate an example fluidic micro-valve of an FMUX, in accordance with the present disclosure. More particularly, FIGS. 3A-3C may include a partial view of a microfluidic device 100, 200 including one of the fluidic micro-valves 106 of FIG. 1, the fluidic micro-valves 206 of FIG. 2, and the various additional fluidic micro-valves of microfluidic device as further illustrated herein. As previously described, each of a plurality of fluidic channels of a microfluidic device is fluidically coupled to a plurality of fluidic micro-valves. FIGS. 3A-3C illustrate an example fluidic micro-valve 306 of a FMUX, with each of the plurality of fluidic micro-valves of the FMUX including similar components.

As shown by FIG. 3A, the fluidic micro-valve 306 includes a passage 318 and a side chamber 316. The passage 318 comprises an opening fluidically coupled to a respective fluidic channel 302 of a plurality of fluidic channels, such as illustrated by microfluidic device 200 of FIG. 2. The fluidic channel 302 is a passage through which fluid flows from an input side to an output side. As shown by FIG. 3B, the side chamber 316 may house a volume of trapped gas 320. The side chamber 316 is fluidically coupled to the passage 318 to control flow along the respective fluidic channel 302.

As previously described, the fluidic micro-valve 306 may be in one of the following two states at a given time: open state in which the respective fluidic channel 302 is open and fluid is to flow through the respective fluidic channel 302, as illustrated by FIG. 3B, and a closed state in which trapped gas 320 within the side chamber 316 is to expand within the passage 318 and block the flow in the respective fluidic channel 302, as shown by FIG. 3C. The trapped gas 320 in the side chamber 316 may expand upon heating to block the flow of fluid through the fluidic channel 302. The "X" in FIG. 3C is shown to illustrate the blockage of fluid flow, and is further used herein as symbolizing the fluidic micro-valves being in the closed state. As the temperature is reduced, the trapped gas 320 retracts into the side chamber 316 and fluid flow through the respective fluidic channel 302 resumes, as shown by FIG. 3B.

In various examples, the side chamber 316 includes a dead-end chamber. The side chamber 316 may be larger in volume than the fluidic channel 302 into which the trapped gas 320 expands.

Although not illustrated, a control line disposed proximal to the fluidic micro-valve 306 may transmit electrical signals to apply a first temperature and a second temperature to the side chamber 316. In response to the first temperature, the trapped gas 320 may remain in the side chamber 316 and may not impede fluid flow in the fluidic channel 302. The second temperature may be greater than the first temperature, and may cause the fluidic micro-valve 306 to enter the closed state illustrated by FIG. 3C. At the second temperature, the trapped gas 320 expands into the passage 318 and into a portion of the fluidic channel 302 so as to fill an entire cross-sectional area of the fluidic channel 302 and block the flow of fluid (as illustrated by the "X"). In such examples, the fluidic micro-valve 306 includes a thermo-pneumatic type with the working principle being a gas, such as air, that is trapped in the enclosed volume of the side chamber 316. When the temperature is elevated, the gas 320 expands, when the temperature is lower, the gas 320 contracts. Volume changes may be estimated from the ideal gas law where: air is volume is approximately proportional to the (absolute) temperature. For example, increases die temperature (and the temperature of the trapped gas 320 from room temperature of 27 degrees Celsius (C) (300 Kelvin (K) to 57 C (330K), may increase the gas volume by ten percent.

In the particular example, the fluidic micro-valve 306 is T-shaped. For example, the passage 318 may be perpendicular to the fluidic channel 302 and the passage 318 may direct gas expansion perpendicular to the flow of fluid through the fluidic channel 302. However, examples are not so limited, and the fluidic micro-valve 306 may be O-shaped. In other examples, the fluidic channel 302 may be at an angle with respect to the passage 318, such as being slanted or otherwise angled less than 90 degrees to the passage 318. The internal width or cross-sectional area of the side chamber 316 may be less than, equal to, or greater than, an internal width or cross-sectional area of the fluidic channel 302. The internal width or cross-sectional area of the passage 318 may be equal to or less than an interval width or cross-sectional area of the fluidic channel 302. The cross-sectional area is referenced with respect to the length of the side chamber 316, the passage 318, and the fluidic channel 302. The fluidic micro-valve 306 may include side chambers 316 having other shapes, such as circular, rectangular, square, and others.

The passage 318 and/or fluidic channel 302 may include capillary breaks 317, 319, 321. A capillary break is a structure, or structural definition, within the passage 318 and/or fluidic channel 302 that provides a change, e.g., decrease, in diameter of the passage 318 and/or fluidic channel 302. The microfluidic devices may include a side capillary break 317, a top capillary break 319, and a bottom capillary break 321 associated with each fluidic micro-valve of the microfluidic device. In some examples, the capillary breaks include sloped or tapered walls that create a decrease in diameter difficult to stop capillary action. In some examples, the capillary breaks may be defined by hydrophobic material or non-porous material, such as glass, plastic, or metal. The capillary breaks may help stabilize the menisci at a fixed location in both the open and closed states, and may further provide margins for geometrical variations and temperature control.

In the example, each capillary break 317, 319, 321 tapers outward from a narrowed diameter in the direction of the fluid flow. In some examples, the passage 318 may further include an indention or recess to narrow the diameter of the passage 318 and then tape outward providing the side capillary break 317.

The device may be primed by introducing fluid to the fluidic channels. When fluid 311 is introduced into the fluidic channel 302, the fluid 311 completely fills the fluidic channel 302 and traps the gas 320 in the side chamber 316. The side capillary break 317 in the passage 318 stabilizes the meniscus at a defined position. At that point, the fluid 311 flows through the fluidic channel 302 unrestricted under capillary or external pressure sources. For example, the top capillary break 319 and a bottom capillary break 321 may not restrict the fluid 111 flow in the direction of the arrow, as shown by FIG. 3B. The side chamber 316 may be at the first temperature and the fluidic micro-valve 306 is in an open state.

The temperature of the trapped gas 320 within the side chamber 318 is raised by applying a second temperature to the side chamber 316 that is greater than the first temperature. The increase in temperature causes the trapped gas 320 to expand into the portion of the fluidic channel 301 and block the flow of fluid 311, as shown by FIG. 3C. The expansion encompasses the full width of the fluidic channel 302. The top capillary break 319 and a bottom capillary break 321 in the fluidic channel 302 may help stabilize the menisci at fixed locations and provide margins for geometrical variations and temperature control. In such examples, the fluidic micro-valve 306 is in the closed state. The passage 318, side chamber 316, and the portion of the fluidic channel 302 in which the trapped gas 320 expands may be generally referred to as a fluidic micro-valve 306.

The fluidic micro-valve 306 is reversible by lowering the temperature of the side chamber 316 back to the first temperature. In response, the trapped gas 320 contracts. As the bubble of the trapped gas 320 is pulled back into the side chamber 316, the open state of the fluidic micro-valve 306 is restored and the fluid 311 may flow in the fluidic channel 302. The process may be repeated many times.

The trapped gas may be a variety of types of gas, such as air, sterile air, oxygen, hydrogen, carbon dioxide, inert gas (e.g., nitrogen, helium, argon, etc.), and combination thereof. The fluid 311 in the fluidic channel 302 may be selected based on factors of the microfluidic device (e.g., chemical stability, viscosity, surface tension, compressibility, and other properties) which may be present in the fluidic channel 302 and may be controlled by the fluidic micro-valve 306. For example, gaps of the capillary breaks 317, 319, 321 may depend on surface tension of the fluid 311 and its contact angle with the walls of the fluidic channel 302.

The fluidic micro-valves of the FMUX may have a particular ratio of work volume to valve volumes. The work volume includes and/or refers to the volume of the side chamber 316. The valve volume includes and/or refers to the volume of the fluidic micro-valve 306. The fluidic micro-valves may be reversibly placed into the open state and closed state. In the open state, the trapped gas 320 occupies the work volume, or in other words, the volume of the side chamber 316. In the closed state, the trapped gas 320 expands and occupies the work volume and the valve volume, or in other words, the volume of the side chamber 316, the passage 318, and the portion of the fluidic channel 302 into which the trapped gas 320 expands. The work volume and the valve volume are related by temperature. From the ideal gas law:

$$\frac{V_W + V_V}{V_W} = \frac{T_2}{T_1}$$

from where $$V_W = V_V \frac{T_1}{T_2 - T_1},$$

Where $T_1$ and $T_2$ are absolute temperatures of the open state and the closed state, respectively. In some examples, the work volume to valve volume ratio ($V_W/V_V$) is approximately 10, which implies that $(T_2-T_1)/T_1=0.1$. Such example valves may be operated between $T_1=310K$ ($T_1=37$ C) and $T_2=351K$ ($T_2=68$ C). For such operating conditions, the valve area may be 30×300 um$^2$ and the work area may be 300×300 um$^2$.

In other examples, the work volume to valve volume ratio ($V_W/V_V$) is approximately 30, which implies that $(T_2-T_1)/T_1=0.03$. Such example fluidic micro-valves may be operated at smaller temperature differences than the above-described examples, such as between $T_1=310K$ ($T_1=37$ C) and $T_2=320K$ ($T_2=47$ C). For such operating conditions, the valve area may be 30×300 um$^2$ and the work area may be 900×300 um$^2$. The higher volume ratio may use a larger area for the side chamber on the microfluidic device, however, the valves operate as previously described.

In various examples, the work volume to valve volume ratio ($V_W/V_V$) is between 5 and 50. For specific valve volume ratios, the open and closed states have operating temperatures that may be determined from the ideal gas law. While reference is made to particular examples dimensions, the above are provided as examples of dimensions of the work volume, the valve volume, and the work temperatures.

Changing the valve internal volume or the internal space within the fluidic micro-valve 306 may affect the operation of the FMUX. In some examples, two spaces of the fluidic micro-valve 306 may be referred to as the passage space 323 and the fluidic channel space 325, which is the portion into which the trapped gas 320 expands within the fluidic channel 302.

In some examples, the internal valve width of the passage space 323 and the fluidic channel space 325 may be equal to the internal width of other portions of the fluidic channel 302. Such example fluidic micro-valves may be referred to as "full volume valves".

In other examples, the internal valve width of the passage space 323 and the fluidic channel space 325 may be less than the internal width of other portions of the fluidic channel 302. Such example fluidic micro-valves may be referred to as "small volume valves". Small volume valves may decrease the work volume and $T_2-T_1$ used for valve operation as compared to full volume valves. Additionally, narrow widths of channels and capillary breaks may increase the holding pressure of the plurality of fluidic micro-valves. However, narrow channels increase the fluidic resistance of the fluidic channel 302 and may decrease the flow rate, as compared to full volume valves. In some examples, small volume valves are used for the FMUX to minimize side chamber 316 volume for space constraints. In some examples, small volume valves are used for the FMUX to minimize the closed state temperature and reduce evaporation or chemical instability. In some examples, full volume valves are used for the FMUX for controlling a high-viscosity fluid, such as whole blood. The high viscosity and narrow widths of the fluidic channel 302 may increase fluidic resistance and reduce flow rate in the open state of the fluidic micro-valve 306. The fluidic channel 302 used to receive a high viscosity fluid may include a wide width to accommodate the viscosity of the fluid in the open state.

In general, the internal shape of the fluidic micro-valve 306 is a multi-dimensional object that is adaptable to the environment of the particular microfluidic device. In some examples, the internal valve widths between the passage 318 and the portion of the fluidic channel 302 may be the same or different with respect to one another. In some examples, the passage 318 has a smaller internal width than the portion of the fluidic channel 302. In other examples, the portion of the fluidic channel 302 has a smaller internal width than the passage 318.

Although not illustrated, in some examples, the fluidic micro-valves may additionally include another heating component. The heating component may be disposed within or otherwise coupled to the side chamber 316, the passage 318, and/or the portion of the fluidic channel 302. The heating component may include any type of thermal heating device that may heat the trapped gas 320. Examples include resistors, such as TIJ resistors, and transistors, such as field effect transistors. The heating component may be used to apply a temperature to the side chamber 316 in response to electrical signals transmitted along the control lines. In some examples, both the heating component and the control lines may be used to apply the temperatures.

The above-described fluidic micro-valves allow for flexibility in the shapes of the side chamber 316. The side chamber 316 may include a volumetric shape that may encompass an unused space within the microfluidic device. Since gas may fill up any shaped space, it is the total volume of the side chamber 316 that impacts the operation of the fluidic micro-valve 306, not the shape. The side chambers are not limited to the rectangular shape illustrated, and may include circular shapes, serpentine shapes, pentagon shapes, star shapes, among others. In some examples, the work volume of the side chambers have thermal contact with one control line, and not with other control lines. The side chambers may assume many different shapes to fit between other fluidic features, thereby filling up unused areas and reduce the overall device dimensions. For example, a serpentine shape may fill elongated spaces by winding around various channels or other features. As such, the microfluidic device comprising the FMUX may be manufactured to be smaller due to the lower space used for the side chambers of the fluidic micro-valves.

In various examples, priming may occur, such as by using an inlet port on which liquid may be pipetted or printed by an ejection device. In some examples, plurality of fluidic channels may be fabricated on a silicon substrate through which slots are machined. A liquid may be delivered on the back of the die by pipetting or otherwise flowing from a container. In some examples, the liquid may be stored inside a blister pack that is punctured upon insertion into an instrument. The liquid may be squeezed toward either an input port or a through silicon slot and priming processed by capillary action. Examples are not so limited and may include other types of priming techniques.

Figure 4A:
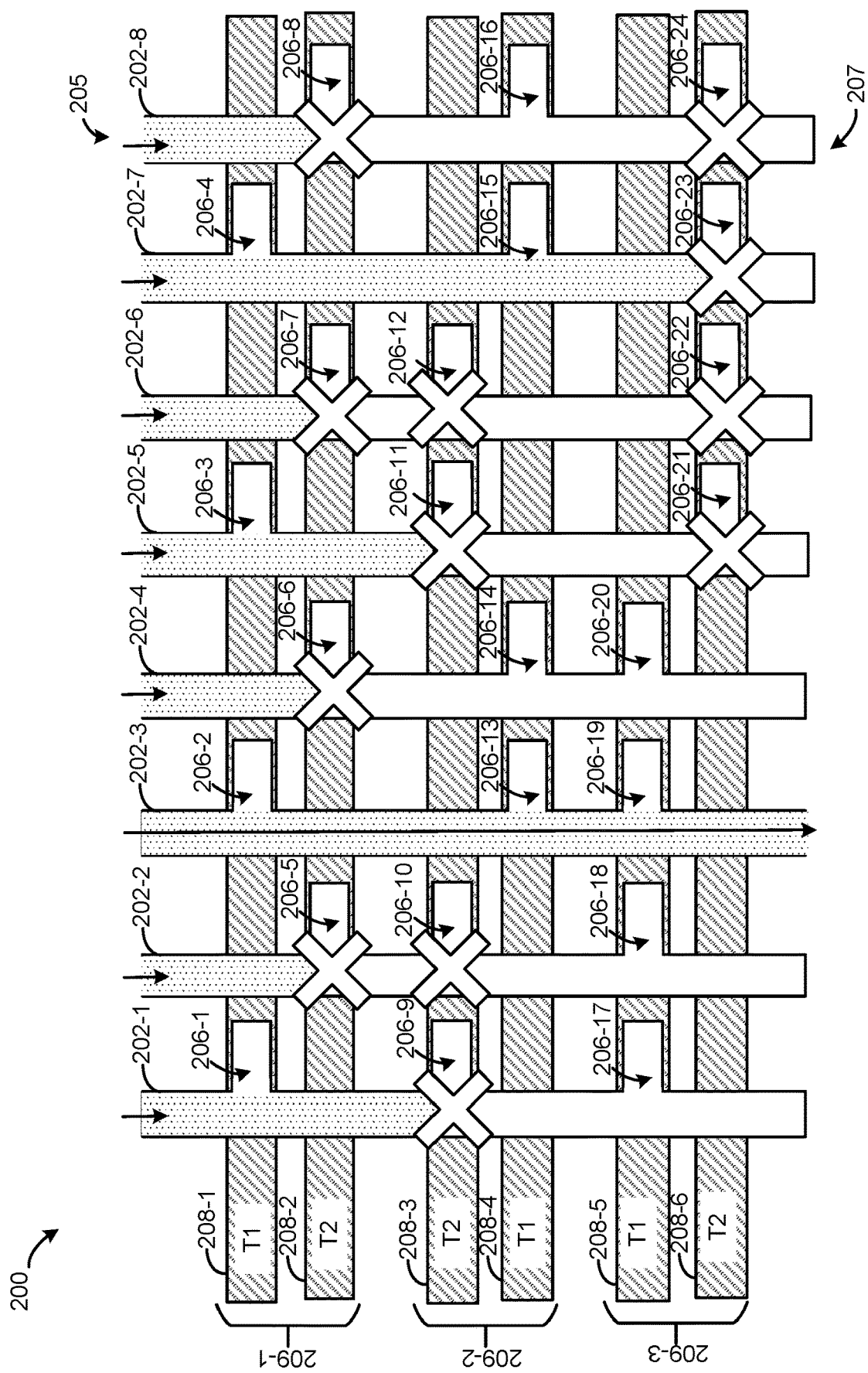
FIGS. 4A-4B illustrate example operations of a microfluidic device comprising a FMUX, in accordance with the present disclosure.
Figure 4B:
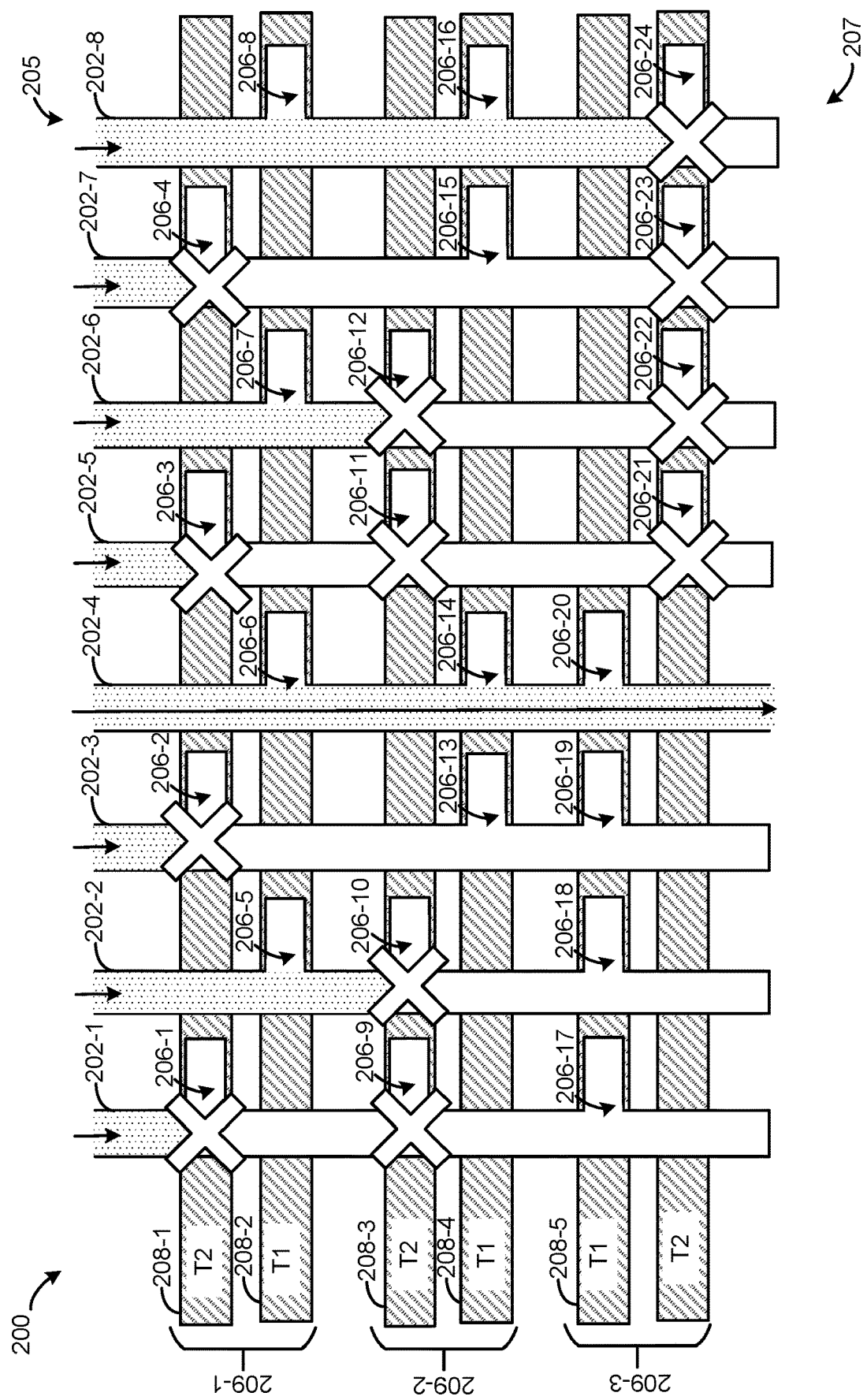

FIGS. 4A-4B illustrate example operations of a microfluidic device comprising a FMUX, in accordance with the present disclosure. The microfluidic device 200 illustrated by FIGS. 4A-4B may include the microfluidic device 200 illustrated by FIG. 2, and including the plurality of fluidic channels 202 and the FMUX including the plurality of fluidic micro-valves 206 and the plurality of control lines 208, the details of which are not repeated. Although not illustrated by FIGS. 4A-4B, the microfluidic device 200 may further include circuitry and a substrate, as illustrated by FIG. 2.

As previously described, the plurality of control lines 208 may be grouped into pairs of control lines 209 and each pair of control lines 209 is addressable by digital data. The digital data may include a binary code including a plurality of digital bits, with each digital bit being used to address one of the pairs of control lines 209. To start, all control lines 208 may be set to the open temperature $T_1$, and each of the plurality of fluidic channels 202 are primed with fluids to trap the gas within the side chambers of the fluidic micro-valves 206. After priming and within each pair of control lines 209 (which may be referred to as a digital bit), a first control line of the pair 209 is set to the closed temperature $T_2$ and the second control line of the pair 209 is kept at the open temperature $T_1$. For example, for each pair of control lines 209, a bit of a digital value of "0" may set a top control line 208-1, 208-3, 209-5 to $T_2$, and the bottom control line 208-2, 208-4, 208-6 to $T_1$. Conversely, a bit of a digital value of "1" may set a top control line 208-1, 208-3, 209-5 to $T_1$, and the bottom control line 208-2, 208-4, 208-6 to $T_2$. However examples are not so limited, and the reverse may be used in which a bit of a digital value of "0" may set the top control line 208-1, 208-3, 208-5 to $T_1$ and the bottom control line 208-2, 208-4, 208-6 to $T_2$, and vice versa.

In the example illustrated by FIG. 4A, a binary code of "101" is provided to the plurality of pairs of control lines 209 and used to allow flow through the particular fluidic channel 202-3 and to prevent flow through the remaining plurality of fluidic channels 202. The particular fluidic channel 202-3 may be considered to be addressed by the binary code "101".

In the example illustrated by FIG. 4B, the bit 1 used to address the first pair of control lines 209-1 is flipped from "1" to "0", resulting in a binary code of "001" being provided to the plurality of pairs of control lines 209 and used to allow flow through the particular fluidic channel 202-4 and to prevent flow through the remaining plurality of fluidic channels 202. The particular fluidic channel 202-4 may be considered to be addressed by the binary code "001".

In the examples illustrated by FIG. 4A-4B, any binary code may be used to allow flow of fluid through one of the plurality of fluidic channels 202 and to block flow of fluid through the remaining plurality of fluidic channels 202. The three-bit FMUX (e.g., six control lines) provides complete fluidic control of eight fluidic channels.

While various illustrated microfluidic devices 200 include six control lines to control eight fluidic channels, examples are not so limited and may include different numbers of control lines and fluidic channels. In some examples, the microfluidic device 200 has 2N control lines and $2^N$ fluidic channels, wherein N data inputs (e.g., N bits) to the plurality of control lines 208 are to control the flow of fluid through each of the $2^N$ fluidic channels 202. In other examples, the microfluidic device 200 has 2N−1 control lines and $2^N$ fluidic channels.

The use of the above described FMUX may reduce the number of control lines to control a plurality of fluidic channels, with the reduction being particularly apparent at N equal to or greater than 3. Table 1 below illustrates different numbers of fluidic channels and the corresponding number of control lines used to control flow through the fluidic channels, with N equaling the number of bits used in a binary code to address the control lines and to allow fluid to flow through a respective fluidic channel. In this manner, the binary code may be said to address the respective fluidic channel.

TABLE 1

| N | Number of Channels ($2^N$) | Number of Control Lines (2N) | FMUX length (at 0.4 mm pitch) |
|---|---|---|---|
| 1 | 2 | 2 | 0.8 mm |
| 2 | 4 | 4 | 1.6 mm |
| 3 | 8 | 6 | 2.4 mm |
| 4 | 16 | 8 | 3.2 mm |
| 5 | 32 | 10 | 4.0 mm |
| 6 | 64 | 12 | 4.8 mm |
| 8 | 256 | 16 | 6.4 mm |
| 10 | 1024 | 20 | 8.0 mm |
| 16 | 65536 | 32 | 12.8 mm |

As shown by Table 1, the number of channels grows exponentially with the number of control lines. In some examples, the FMUX may be used to control DNA libraries. For example, twelve control lines may be used to control a three-base DNA library, with 64 DNA trimers flowing through the 64 fluidic channels. At 0.4 mm pitch (0.2 mm control line width plus 0.2 mm gap between control lines), the total FMUX length is 4.8 mm. However examples are not so limited and may include other pitch values. As another example, eight control lines may be used to control a two-base DNA library with 16 DNA dimers flowing through the 16 fluidic channels. Sixteen control lines may be used to control a four-base DNA library with 256 tetramers flowing through the 256 fluidic channels occupying 6.4 mm of linear space.

Figure 5:
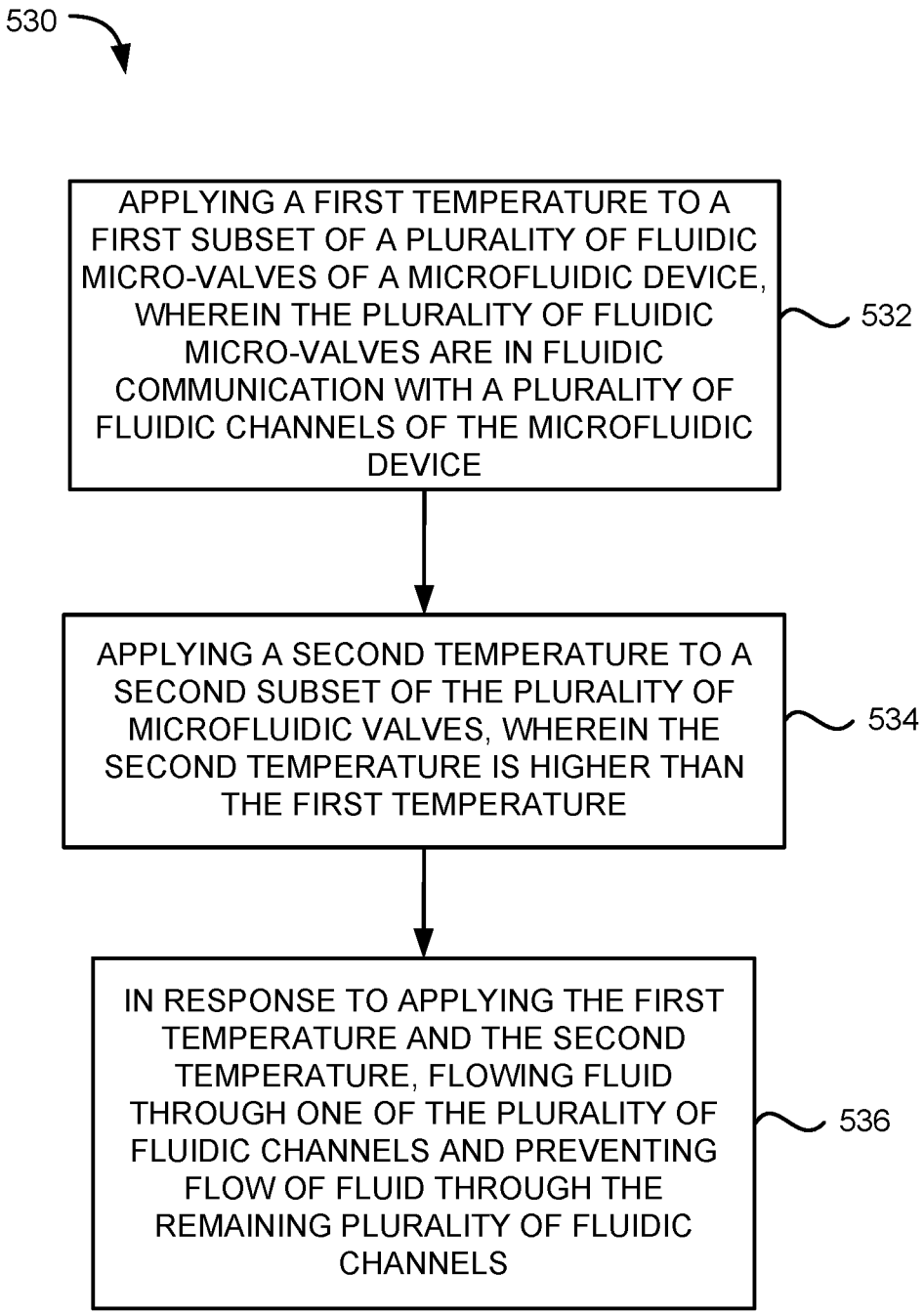
FIG. 5 illustrates an example method of controlling flow of fluid within fluidic channels of a microfluidic device using a FMUX, in accordance with the present disclosure.

FIG. 5 illustrates an example method of controlling flow of fluid within fluidic channels of a microfluidic device using a FMUX, in accordance with the present disclosure. The method 530 may be performed by the microfluidic device 100 of FIG. 1, the microfluidic device 200 of FIG. 2 and FIGS. 4A-4B, and/or any of the further illustrated microfluidic devices 600, 700, 800, 900 further illustrated herein by FIGS. 6-9.

At 532, the method 530 includes applying a first temperature to a first subset of a plurality of fluidic micro-valves of a microfluidic device, wherein the plurality of fluidic micro-valves are in fluidic communication with a plurality of fluidic channels of the microfluidic device. At 534, the method 530 includes applying a second temperature to a second subset of the plurality of fluidic micro-valves, wherein the second temperature is higher than the first temperature. At 536, the method 530 includes, in response to applying the first temperature and the second temperature, flowing fluid through one of the plurality of fluidic channels and preventing flow of fluid through the remaining plurality of fluidic channels.

In various examples, the method 530 includes separately addressing each pair of a plurality of pairs of control lines of the microfluidic, wherein the plurality of pairs of control lines cross the plurality of fluidic channels proximal to the plurality of fluidic micro-valves. The method 530 further includes, based on the addressing, selectively providing electrical signals along the plurality of pairs of control lines to apply the first temperature and the second temperature. For example, each pair of a plurality of pairs of control lines may be addressed by a respective bit of a binary code.

In some examples, each of the plurality of fluidic micro-valves include a passage in fluidic communication with a respective fluidic channel of the plurality of fluidic channels and a side chamber fluidically coupled to the passage and to house a volume of trapped gas, as previously illustrated by FIGS. 3A-3C. The method 530 may further include priming the microfluidic device by introducing priming fluid to the plurality of fluidic channels and trapping the volume of gas in the side chambers, in response to applying the first temperature, containing the trapped gas in respective side chambers of the first subset of the plurality of fluidic micro-valves, and in response to applying the second temperature, causing the trapped gas in respective side chambers of the second subset of the plurality of fluidic micro-valves to expand into the remaining plurality of fluidic channels, thereby preventing the flow of fluid. In various examples, priming the microfluidic device may include applying the first temperature to each of the plurality of fluidic micro-valves to set each of the plurality of fluidic micro-valves in the open state and to trap the gas within the side chambers. The method 100 may then include selectively applying the first temperature and second temperature to the first subset and second subset of the plurality of fluidic micro-valves.

In some examples, the method 530 may further include sequentially applying the first temperature and the second temperature to different first subsets and different second subsets of the plurality of fluidic micro-valves to provide a sequential flow of fluid from different respective fluidic channels of the plurality of fluidic channels to an output of the microfluidic device. For example, different respective fluidic channels may be selected for the flow of fluid using different binary codes provided in sequence.

Microfluidic devices may include a variety of variations from that previously illustrated. Such variations may include different shaped side chambers, different numbers of fluidic channels, control lines, and fluidic micro-valves, as well as other variations as further illustrated by FIGS. 6-9.

FIG. 6 illustrates an example microfluidic device comprising a FMUX, a plurality of fluidic inputs and an output chamber, in accordance with the present disclosure. In various examples, the FMUX may be used as a front end to a reactor. In some examples, the reactor may be used as a DNA synthesizer to generate different outputs. However, examples are not so limited and other types of reactors may be implemented.

The microfluidic device 600 may include similar components to the microfluidic device 200 of FIG. 2. For example, the microfluidic device 600 includes a plurality of fluidic channels 602-1, 602-2, 602-3, 602-4, 602-5, 602-6, 602-7, 602-8 (herein generally referred to as "the fluidic channels 602" for ease of reference) and an FMUX as previously described, the details of which are not repeated for ease of reference. The FMUX includes the previously described plurality of control lines 608-1, 608-2, 608-3, 608-4, 608-5, 608-6 and fluidic micro-valves (illustrated as the side chambers coupled to the fluidic channels 602 which are not labeled for ease of reference).

At the input side 605 of the fluidic channels 602, the microfluidic device 600 includes a plurality of fluidic inputs 642-1, 642-2, 642-3, 642-4, 642-5, 642-6, 642-7, 642-8

(herein referred to generally as the "fluidic inputs 642" for ease of reference). Each of the fluidic inputs 642 is coupled to one of the plurality of fluidic channels 602. The fluidic inputs 642 may include chambers which house a different fluid and/or a port otherwise coupled to the fluid sources. In some examples, the different fluids may be stored on-device, such as being contained in chambers on the substrate forming the microfluidic device 600. In other examples, the different fluids may be stored off-device, such as external fluid sources which are coupled to the fluidic inputs 642.

At the output side 607 of the fluidic channels 602, the microfluidic device 600 further includes an output chamber 648 coupled to each of the plurality of fluidic channels 602. In some examples, the output chamber 648 is coupled to the output side 607 of the fluidic channels 602 via a branching channel 644 fluidically coupled between the fluidic channels 602 and the output chamber 648. The output chamber 648 forms part of a reactor 646. For example, the reactor 646 includes the chamber 648 in which reactions occur between fluids, such as between trapped beads and components of the fluids. The chamber 648 may include the trapped beads, heaters, mixers, sensors, fluidic pumps, as illustrated by the respective fluidic pump 649 and/or other components used to provide a reaction, such as allowing for DNA synthesis. The reactor 646 may further includes a filter 650, such as a 4 um filter, used to prevent beads from passing. The fluidic pumps may be used to eject the reacted solution, such as synthesized DNA, from the reactor 646. In some examples, the reacted solution is ejected from the microfluidic device 600 to an external substrate. In some examples, the reacted solution is ejected from the microfluidic device 600 to another portion of the microfluidic device 600 for further reaction(s).

The filter 650 may include a plurality of pillars that are spaced to prevent beads or other particles from flowing through. The pillars may be a variety of different shapes, such as elongated pillars and/or different geometric shaped pillars. In other examples, the filter 650 may include a solid structure with apertures formed therein, with the apertures providing fluidic communication between the sides of the filter 650. The filter 650 may be formed of a variety of materials, such as SU8 material, epoxy-based negative photoresist material, and/or other suitable material, such as silicon and polydimethylsiloxane (PDMS).

In some examples, the reactor 646 includes or is a micromixer to mix fluids. As used herein, a micromixer includes and/or refers to microparts, such as a channel, chamber and/or other parts, used to mix fluids. In some examples, the micromixer includes or is in fluidic communication with an energy source to drive the flow of fluid throughout other microparts and cause mixing of different fluids. Example energy sources include a fluidic pump, as previously described, an electrode array or other source of an electrical field, an acoustic source, a magnet, a rotating plate or other source of centrifugal forces, among other energy sources. In some examples, the fluid may be mixed within the micromixer using passive mixing, such as using unbalanced collision channels, an embedded barrier channel, a convergent-divergent channel, a chamber with different channels, a three-dimensional spiral, an overbridge, among other types of passive micromixers.

FIG. 7 illustrates an example microfluidic device comprising a FMUX, a fluidic input, and plurality of fluidic outputs, in accordance with the present disclosure. In various examples, the FMUX may be used as a distributor or a sorter. For example, the microfluidic device 700 may operate with one fluid and has one fluidic input 752 with multiple fluidic outputs 754-1, 754-2, 754-3, 754-4, 754-5, 75406, 754-7, 754-8 (herein generally referred to as "the fluidic outputs 754").

The microfluidic device 700 may include similar components to the microfluidic device 200 of FIG. 2. For example, the microfluidic device 700 includes a plurality of fluidic channels 702-1, 702-2, 702-3, 702-4, 702-5, 702-6, 702-7, 702-8 (herein generally referred to as "the fluidic channels 702" for ease of reference) and an FMUX as previously described, the details of which are not repeated for ease of reference. The FMUX includes the previously described plurality of control lines 708-1, 708-2, 708-3, 708-4, 708-5, 708-6 and fluidic micro-valves (illustrated as the side chambers coupled to the fluidic channels 702 which are not labeled for ease of reference).

At the input side 705 of the fluidic channels 702, the microfluidic device 700 includes a fluidic input 752 fluidically coupled to each of the fluidic channels 702, which may be referred to as a "common fluidic input 752". The fluidic input 752 may include a chamber which houses a fluid and/or a port otherwise coupled to a source of the fluid. In some examples, the fluid may be stored on-device, such as being contained in a chamber on the substrate forming the microfluidic device 700. In other examples, the fluid may be stored off-device, such as an external fluid source which are coupled to the fluidic input 752, such as an input port.

At the output side 707 of the fluidic channels 702, the microfluidic device 700 includes the fluidic outputs 754, each of fluidic outputs 754 being coupled to one of the plurality of fluidic channels 702. In some examples, the microfluidic device 700 operates with one fluid and used the fluidic outputs 754 to control which one of the fluidic outputs 754 the fluid is delivered to. The fluidic outputs 754 may be coupled to other components of the microfluidic device 700, such as different channels or chambers. In some examples, the fluidic outputs 754 may include or be coupled to different ejection nozzles to eject the fluid to different external locations.

In some examples, the microfluidic device 700 of FIG. 7 and/or the microfluidic device 600 of FIG. 6 may further include sensors located proximal to the output side 607, 707, such as proximal to the branching channel 644 or the fluidic outputs 754. The sensors may be used to provide feedback to circuitry for controlling the FMUX.

In some examples, the microfluidic device 700 of FIG. 7 and/or the microfluidic device 600 of FIG. 6 further includes circuitry that may be used to control components of the devices, such as the circuitry 210 previously described in connection with FIG. 2.

Any of the above or below described microfluidic devices that comprise an FMUX may maintain a finite temperature difference, such as $T_1$ and $T_2$, between closely spaced control lines, such silicon slivers. For example, the control lines may be spaced apart by a range of 0.1 to 1.0 mm. In some examples, the control lines, which are in a separate layer from the fluidic channels and fluidic micro-valves, may be separated from adjacent control lines by a thermal barrier. The thermal barrier may include a polymer or plastic, epoxy, and/or air gaps, among other barriers.

Example FMUXs may be implemented on a variety of different types of substrates, such as EMC substrates and/or monolithic silicon (Si) wafer. In some examples, such as with a monolithic Si wafer, the substrate is thermally conductive.

As described above, the operating delta T of $T_2-T_1$ may be determined by the volume of the trapped gas. The larger the volume, the smaller the delta T. Larger volumes may use smaller delta T and may also use more die area. Example FMUXs using thermo-pneumatic fluidic micro-valves may have a trade-off between size and operating delta T.

Figure 8:
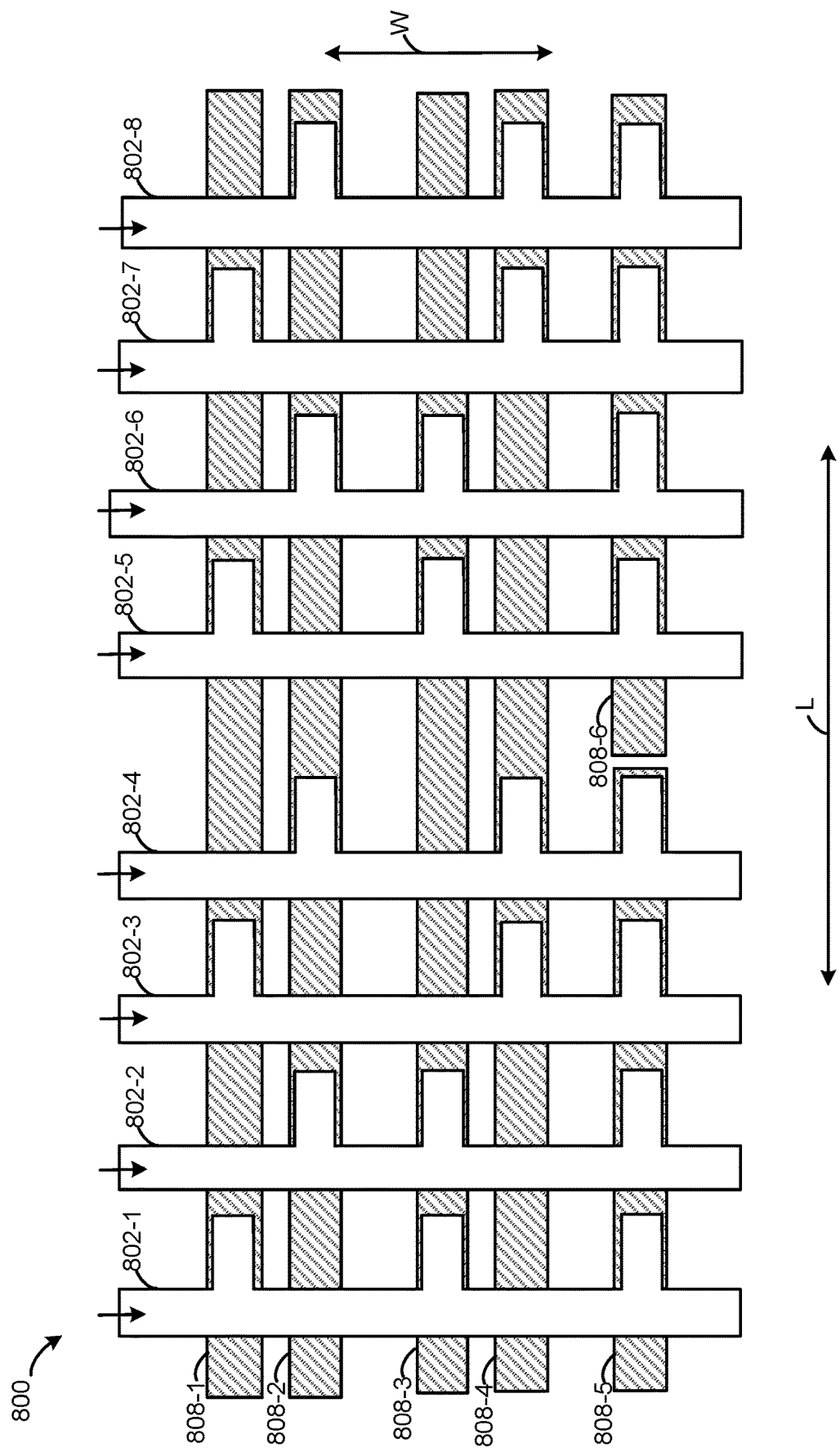
FIG. 8 illustrates an example microfluidic device comprising a FMUX with a pair of control lines stacked along a length of the microfluidic device, in accordance with the present disclosure.

FIG. 8 illustrates an example microfluidic device comprising a FMUX with a pair of control lines stacked along the length of the microfluidic device, in accordance with the present disclosure.

The microfluidic device 800 may include similar components to the microfluidic device 200 of FIG. 2. For example, the microfluidic device 800 includes a plurality of fluidic channels 802-1, 802-2, 802-3, 802-4, 802-5, 802-6, 802-7, 802-8 (herein generally referred to as "the fluidic channels 802" for ease of reference) and an FMUX as previously described, the details of which are not repeated for ease of reference. The FMUX includes the previously described plurality of control lines 808-1, 808-2, 808-3, 808-4, 808-5, 808-6 (herein generally referred to as the "control lines 808" for ease of reference) and fluidic micro-valves (illustrated as the side chambers coupled to the fluidic channels 802 which are not labeled for ease of reference).

In some examples, the pairwise arrangement of the control lines 808 may be modified. For example, the third bit that uses the respective control lines 808-5, 808-6 may be stacked in a length (L) wise arrangement, rather than the width (W) (or side-by-side) arrangement. Such an arrangement may decrease the distance of the FMUX in the W direction. For example, the microfluidic device 800 may use five sliver pitches, instead of six sliver pitches used by the microfluidic device 200 of FIG. 2.

FIG. 9 illustrates an example microfluidic device comprising a FMUX with a thermal barrier disposed within a control line of a plurality of control lines, in accordance with the present disclosure.

The microfluidic device 900 may include similar components to the microfluidic device 200 of FIG. 2. For example, the microfluidic device 900 includes a plurality of fluidic channels 902-1, 902-2, 902-3, 902-4, 902-5, 902-6, 902-7, 902-8 (herein generally referred to as "the fluidic channels 902" for ease of reference) and an FMUX as previously described, the details of which are not repeated for ease of reference. The FMUX includes the previously described plurality of control lines 908-1, 908-2, 908-3, 908-4, 908-5 and fluidic micro-valves (illustrated as the side chambers coupled to the fluidic channels 902 which are not labeled for ease of reference).

In some examples, one of the bits may use one control line, rather than a pair, to maintain two independent temperatures along its length. In the particular example, the third bit uses the respective control line 908-5 which includes a thermal barrier 960 along the length (L) of the control line 908-5. The thermal barrier 960 may be used to maintain different temperature zones, Zone A 963 and Zone B 965. Although two zone are illustrated, additional temperature zones may be created using a plurality of thermal barriers, which may reduce the number of control lines 906 and the width (W) of the FMUX, while increasing the complexity of electrical connections and increasing the L of the FMUX and/or the control line 908-5. The temperature zones 963, 965 may be implemented, in some examples, through the use of the built-in heating components, e.g., the control line 908-5, and heat sinks.

Figure 10B:
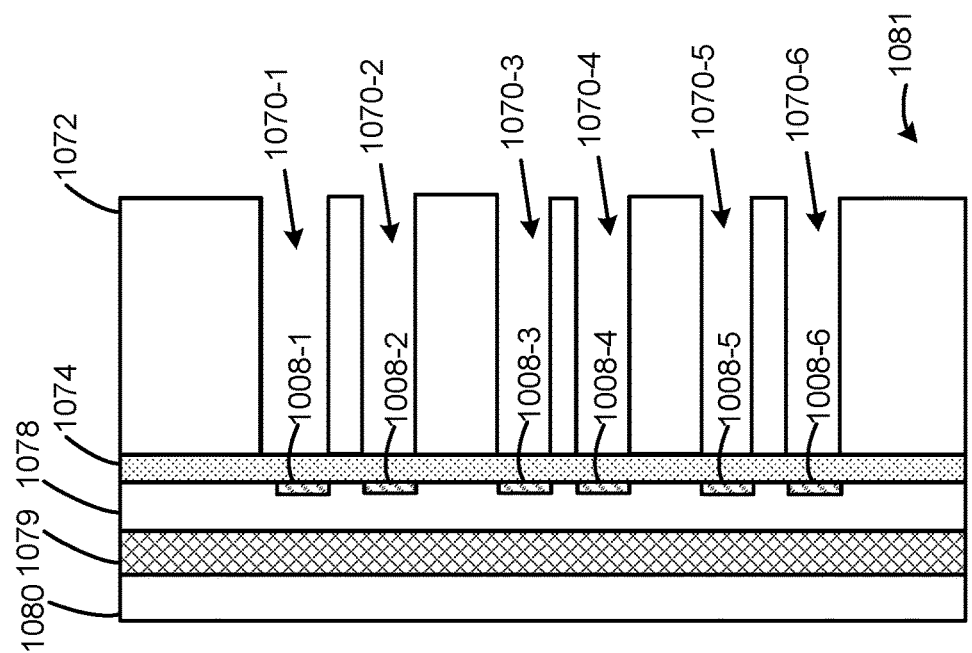
FIGS. 10A-10B illustrate layers of an example microfluidic device comprising a FMUX, in accordance with the present disclosure.
Figure 10A:
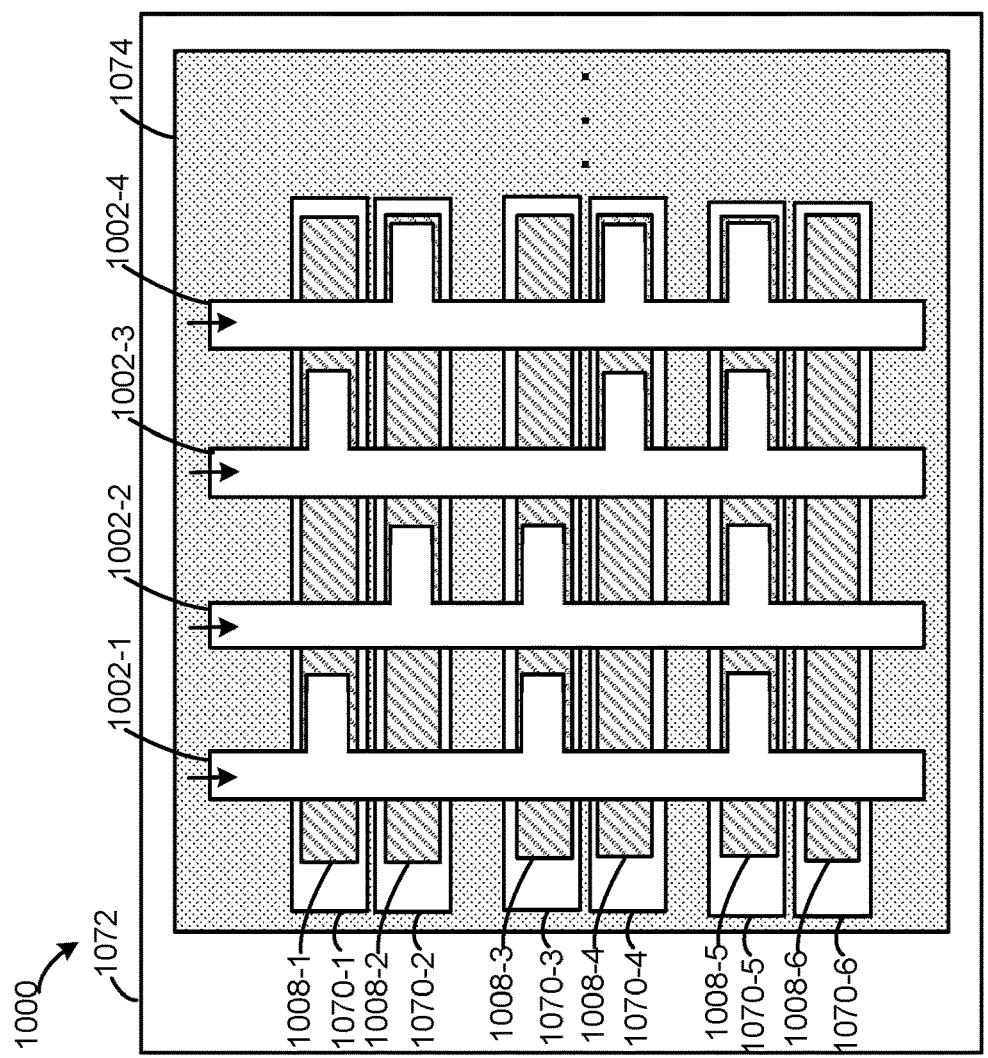

FIGS. 10A-10B illustrate layers of an example microfluidic device comprising a FMUX, in accordance with the present disclosure.

The microfluidic device 1000 may include similar components to the microfluidic device 200 of FIG. 2. For example, the microfluidic device 1000 includes a plurality of fluidic channels 1002-1, 1002-2, 1002-3, 1002-4 (herein generally referred to as "the fluidic channels 1002" for ease of reference) and an FMUX as previously described, the details of which are not repeated for ease of reference. The FMUX includes the previously described plurality of control lines 1008-1, 1008-2, 1008-3, 1008-4, 1008-5, 1008-6 (herein generally referred to as the "control lines 1008" for ease of reference) and fluidic micro-valves (illustrated as the side chambers coupled to the fluidic channels 1002 which are not labeled for ease of reference). Although FIG. 10A illustrates four fluidic channels, the microfluidic device 1000 contains additional channels, as illustrated by the ellipsis (" . . . "). In some examples, the microfluidic device 1000 contains eight fluidic channels 1002 and six control lines 1008, with four fluidic channels illustrated for ease of illustration.

In some examples, the microfluidic device 1000 may include a monolithic substrate 1072, such as a Si wafer, and an isolated membrane 1074 used to provide thermal isolation. The control lines 1008, which may be referred to as "thin film heaters", may be fabricated on top of the isolated membrane 1074. The membrane 1074 may be made of a variety of materials, such as $SiO_2$, $Si_3N_4$, $SiO_xN_y$, SiC, SU8, photoresist, and other materials and combinations thereof. The backside 1081 of the substrate 1072 may be etched away, as shown by the etched trenches 1070-1, 1070-2, 1070-3, 1070-4, 1070-5, 1070-6, 1070-7, 1070-8, thereby leaving membrane material suspended in the substrate frame. The suspended area may be segmented, and the control lines 1008 are formed therein. Further, the fluidic channels 1002 and fluidic valves may be formed as a layer of SU8 or other material.

FIG. 10B illustrates a cross-sectional view of the microfluidic device 1000 of FIG. 10A. As shown, the microfluidic device 100 includes a first layer including the substrate 1072 with the etched trenches 1070-1, 1070-2, 1070-3, 1070-4, 1070-5, 1070-6, 1070-7, 1070-8, a second layer including the membrane 1074, the control lines 1008 formed in the membrane material suspended in the substrate frame, the third layer 1078 that separates the control lines 1008 from the fluidic channels 1002 and fluidic valves, a fourth layer 1079 in which the fluidic channels 1002 and fluidic valves, and a fifth layer 1080 that bounds the fluidic channels 1002 from the top. The fourth layer 1079 may be formed of SU8 and the fifth layer 1080 may be formed of EMC. However, examples are not so limited and may include different layers, materials and other variations.

Figure 11:
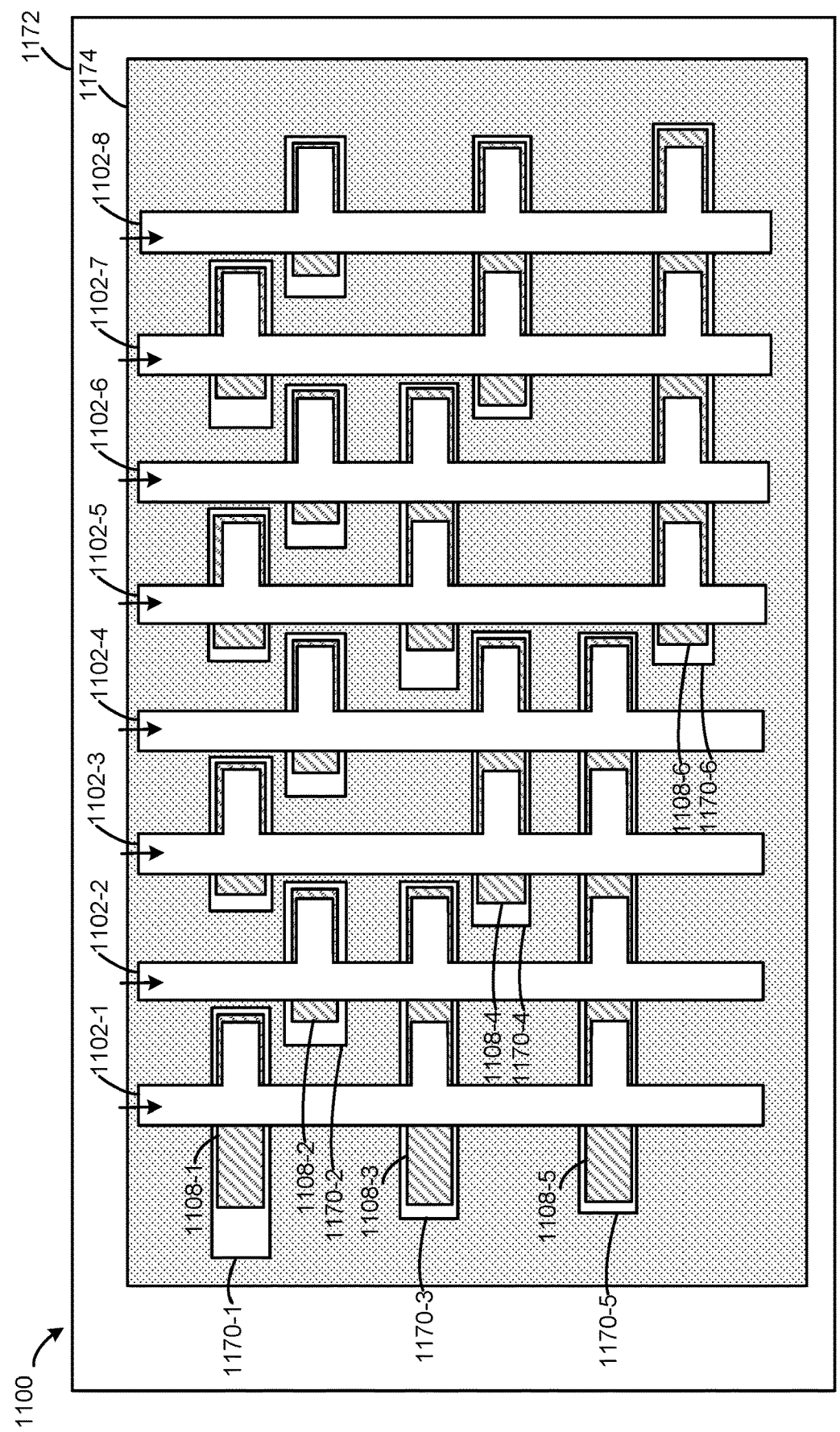
FIG. 11 illustrates layers of another example microfluidic device comprising a FMUX, in accordance with the present disclosure.

FIG. 11 illustrates layers of another example microfluidic device comprising a FMUX, in accordance with the present disclosure.

The microfluidic device 1100 may include similar components to the microfluidic device 1000 of FIGS. 10A-10B. For example, the microfluidic device 1100 includes a plurality of fluidic channels 1102-1, 1102-2, 1102-3, 1102-4, 1102-5, 1102-6, 1102-7, 1102-8 (herein generally referred to as "the fluidic channels 1102" for ease of reference) and an FMUX as previously described, the details of which are not repeated for ease of reference. The FMUX includes the previously described plurality of control lines 1108-1, 1108-2, 1108-3, 1108-4, 1108-5, 1108-6 (herein generally referred to as the "control lines 1108" for ease of reference) and fluidic micro-valves (illustrated as the side chambers coupled to the fluidic channels 1102 which are not labeled for ease of reference).

As with microfluidic device 1000 of FIGS. 10A-10B, the microfluidic device 1100 may include a monolithic substrate 1172 and an isolated membrane 1174 used to provide thermal isolation. The backside of the substrate 1072 may be etched away, as shown by the etched trenches 1170-1, 1170-2, 1170-3, 1170-4, 1170-5, 1170-6, 1170-7, 1170-8 (herein generally referred to as "the etched trenches 1170"), thereby leaving membrane material suspended in the substrate frame. However, differently from microfluidic device 1000, each etched trench 1170 may include sub-portions along the length (L) of the FMUX. For example, the etched trenches 1170 may not extend all the way across the FMUX continuously, and are formed under the fluidic micro-valves and not under other portions of the microfluidic device 1100. Compared to the continuous trenches of microfluidic device 1000, the microfluidic device 1100 may be more mechanically stable. The suspended area may be segmented, and the control lines 1108 are formed therein. Further, the fluidic channels 1102 and fluidic valves may be formed as a layer of SU8 or other material.

The FMUX described herein may be a binary FMUX used to provide digital control of an exponential number of fluidic channels. The FMUX may serve a front end to many applications, such as on-chip sample preparations and DNA synthesis. The FMUX may be fully integrated on the microfluidic device, including control sources for the FMUX. For example, the FMUX may not use external mechanical pumps to operate. The FMUX is scalable, integrated, and uses reduced die area.

The various figures herein illustrate particular numbers of fluidic channels, control lines, and micro-valves. However, examples are not limited, and may include variety of different orientations. Although the various apparatus illustrate symmetrical designs, examples are not so limited. For example, the microfluidic devices may include high through-put and/or parallel designs.

Circuitry as used herein, such as circuitry 210, include a processor, machine readable instructions, and other electronics for communicating with and controlling the fluidic micro-valves, and other components of fluidic micro-valves, such as sensor(s), the fluidic pump(s) and/or resistor(s), and other components. The circuitry may receive data from a host system, such as a computer, and includes memory for temporarily storing data. The data may be sent to the apparatus along an electronic, infrared, optical, or other information transfer path. A processor may be a central processing unit (CPU), a semiconductor-based microprocessor, a graphics processing unit (GPU), a microcontroller, special purpose logic hardware controlled by microcode or other hardware devices suitable for retrieval and/or execution of instructions stored in a memory, or combinations thereof. In addition to or alternatively to retrieving and executing instructions, the processor may include at least one integrated circuit (IC), other control logic, other electronic circuits, or combinations thereof that include a number of electronic components for performing the function. In some examples, the circuitry includes non-transitory computer-readable storage medium that is encoded with a series of executable instructions that may be executed by the processor. Non-transitory computer-readable storage medium may be an electronic, magnetic, optical, or other physical storage device that contains or stores executable instructions. Thus, non-transitory computer-readable storage medium may be, for example, Random Access Memory (RAM), an Electrically Erasable Programmable Read-Only Memory (EEPROM), a storage device, an optical disc, etc. In some examples, the computer-readable storage medium may be a non-transitory storage medium, where the term 'non-transitory' does not encompass transitory propagating signals.

The term "fluid", as used herein, refers to a substance that flows under applied pressure gradient. The fluid(s) may include a variety of different fluids, such as biologic samples, reagents or reactants, agents, among other fluids. A biologic sample, as used herein, refers to any biological material, collected from a subject.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A microfluidic device comprising:
a plurality of fluidic channels; and
a fluidic multiplexor (FMUX) including:
a plurality of fluidic micro-valves fluidically coupled to the plurality of fluidic channels; and
a plurality of control lines that cross the plurality of fluidic channels proximal to the plurality of fluidic micro-valves, wherein at least one of the plurality of control lines crosses under more than one of the plurality of fluidic channels, wherein the plurality of control lines are thermally coupled to the plurality of fluidic micro-valves, and wherein the plurality of control lines are configured to control the plurality of fluidic micro-valves and to allow fluid to flow through a select one of the plurality of fluidic channels and to prevent flow of fluid through the remaining plurality of fluidic channels.

2. The microfluidic device of claim 1, further including circuitry to transmit digital data as electrical signals over the plurality of control lines to control the plurality of fluidic micro-valves and to control flow of fluid through the plurality of fluidic channels.

3. The microfluidic device of claim 1, wherein each of the plurality of fluidic micro-valves include:
a passage comprising an opening fluidically coupled to a respective fluidic channel of the plurality of fluidic channels; and
a side chamber to house a volume of trapped gas, the side chamber being fluidically coupled to the passage to control flow along the respective fluidic channel, wherein each of the plurality of fluidic micro-valves includes one of the following two states at a given time:
an open state in which the respective fluidic channel is open and fluid is to flow through the respective fluidic channel; and
a closed state in which trapped gas within the side chamber is to expand within the passage and block the flow in the respective fluidic channel.

4. The microfluidic device of claim 1, wherein each of the plurality of fluidic channels are coupled to $2^N/2$ fluidic micro-valves, and the microfluidic device has 2N control lines and $2^N$ fluidic channels, wherein N data inputs to the plurality of control lines are to control a flow of fluid through each of the $2^N$ fluidic channels.

5. The microfluidic device of claim 1, further including a thermal barrier disposed within a control line of the plurality of control lines.

6. The microfluidic device of claim 1, further including:
a fluidic input fluidically coupled to each of the plurality of fluidic channels; and
a plurality of fluidic outputs, each of the plurality of fluidic outputs fluidically coupled to one of the plurality of fluidic channels.

7. The device of claim 1, further including:
a plurality of fluidic inputs, each of the plurality of fluidic inputs fluidically coupled to one of the plurality of fluidic channels; and
an output chamber fluidically coupled to each of the plurality of fluidic channels.

8. The microfluidic device of claim 1, wherein each of the plurality of fluidic channels is coupled to more than one fluidic micro-valve.

9. The microfluidic device of claim 1, wherein each of the plurality of control lines crosses every one of the plurality of fluidic channels, and wherein the fluidic micro-valves are positioned at the fluidic channels with a scattered arrangement such that each control line intersects some but not all of the fluidic micro-valves at the fluidic channels.

10. The microfluidic device of claim 1, wherein each of the plurality of control lines comprises a silicon sliver.

11. The microfluidic device of claim 3, further comprising a heating element disposed within or coupled to the side chamber, the passage, or a portion of the fluidic channel.

12. The microfluidic device of claim 4, wherein N is equal to or greater than 3.

\* \* \* \* \*